United States Patent
Lu et al.

(10) Patent No.: US 7,677,814 B2
(45) Date of Patent: Mar. 16, 2010

(54) MECHANICAL INTERFACE CONVERTER FOR MAKING NON-RUGGEDIZED FIBER OPTIC CONNECTORS COMPATIBLE WITH A RUGGEDIZED FIBER OPTIC ADAPTER

(75) Inventors: Yu Lu, Eden Prairie, MN (US); Randy Reagan, Clinton, MA (US); Dennis Cheatham, Richardson, TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/115,966

(22) Filed: May 6, 2008

(65) Prior Publication Data

US 2009/0003772 A1    Jan. 1, 2009

Related U.S. Application Data

(60) Provisional application No. 60/916,295, filed on May 6, 2007, provisional application No. 60/948,781, filed on Jul. 10, 2007, provisional application No. 61/003,948, filed on Nov. 21, 2007.

(51) Int. Cl.
*G02B 6/36* (2006.01)
(52) U.S. Cl. .................................................. 385/78
(58) Field of Classification Search .................. 385/78, 385/134–135
See application file for complete search history.

(56) References Cited

U.S. PATENT DOCUMENTS

| 4,140,366 A | 2/1979 | Makuch et al. |
| 4,140,367 A | 2/1979 | Makuch et al. |
| 4,142,776 A | 3/1979 | Cherin et al. |
| 4,174,882 A | 11/1979 | McCartney |
| 4,225,214 A | 9/1980 | Hodge et al. |
| 4,279,467 A | 7/1981 | Borsuk et al. |
| 4,354,731 A | 10/1982 | Mouissie |
| 4,684,205 A | 8/1987 | Margolin et al. |
| 4,705,352 A | 11/1987 | Margolin et al. |
| 4,715,675 A | 12/1987 | Kevern et al. |

(Continued)

FOREIGN PATENT DOCUMENTS

DE    35 37 684 A1    4/1987

(Continued)

OTHER PUBLICATIONS

International Search Report and Written Opinion mailed Aug. 20, 2008.

(Continued)

*Primary Examiner*—Uyen-Chau N Le
*Assistant Examiner*—Kajli Prince
(74) *Attorney, Agent, or Firm*—Merchant & Gould P.C.

(57) ABSTRACT

An interface converter is provided for mechanically and optically coupling a non-ruggedized fiber optic connector with a ruggedized adapter port. In a preferred embodiment, the interface converter attaches to an SC fiber optic connector and together form a converted fiber optic connector compatible with the ruggedized adapter port. In certain embodiments, a retractable release sleeve may be removed from the SC fiber optic connector prior to attaching the interface converter. In certain embodiments, the interface converter may be inserted into the ruggedized adapter port prior to being attached to the SC fiber optic connector.

12 Claims, 33 Drawing Sheets

U.S. PATENT DOCUMENTS

| | | |
|---|---|---|
| 4,725,120 A | 2/1988 | Parzygnat |
| 4,793,683 A | 12/1988 | Cannon, Jr. et al. |
| 4,820,185 A | 4/1989 | Moulin |
| 4,902,238 A | 2/1990 | Iacobucci |
| 4,907,853 A | 3/1990 | Hiratsuka |
| 4,961,623 A | 10/1990 | Midkiff et al. |
| 5,042,901 A | 8/1991 | Merriken et al. |
| 5,104,242 A | 4/1992 | Ishikawa |
| 5,212,752 A | 5/1993 | Stephenson et al. |
| 5,214,830 A | 6/1993 | Rozycki |
| 5,267,342 A | 11/1993 | Takahashi et al. |
| 5,276,750 A | 1/1994 | Manning |
| 5,283,848 A | 2/1994 | Abendschein et al. |
| 5,317,663 A | 5/1994 | Beard et al. |
| 5,465,313 A | 11/1995 | Belenkiy et al. |
| 5,590,229 A | 12/1996 | Goldman et al. |
| 5,633,970 A | 5/1997 | Olson et al. |
| 5,715,342 A | 2/1998 | Nodfelt et al. |
| 5,751,874 A | 5/1998 | Chudoba |
| 5,778,122 A | 7/1998 | Giebel et al. |
| 5,887,095 A | 3/1999 | Nagase |
| 5,892,870 A | 4/1999 | Fingler et al. |
| 5,920,669 A | 7/1999 | Knecht et al. |
| 5,923,804 A | 7/1999 | Rosson |
| 5,940,559 A | 8/1999 | Noll |
| 5,946,436 A | 8/1999 | Takashi |
| 5,971,625 A | 10/1999 | Lu |
| 5,971,626 A * | 10/1999 | Knodell et al. ............... 385/60 |
| 5,993,071 A | 11/1999 | Hultermans |
| 6,149,313 A | 11/2000 | Giebel et al. |
| 6,151,432 A | 11/2000 | Nakajima et al. |
| RE37,028 E | 1/2001 | Cooke et al. |
| 6,179,475 B1 | 1/2001 | Takamatsu et al. |
| 6,186,670 B1 | 2/2001 | Austin et al. |
| 6,188,822 B1 | 2/2001 | McAlpine et al. |
| RE37,079 E | 3/2001 | Stephenson et al. |
| RE37,080 E | 3/2001 | Stephenson et al. |
| 6,206,579 B1 | 3/2001 | Selfridge et al. |
| 6,234,683 B1 | 5/2001 | Waldron et al. |
| 6,234,685 B1 | 5/2001 | Carlisle et al. |
| 6,254,278 B1 | 7/2001 | Andrews et al. |
| 6,264,374 B1 | 7/2001 | Selfridge et al. |
| 6,298,190 B2 | 10/2001 | Waldron et al. |
| 6,305,849 B1 | 10/2001 | Roehrs et al. |
| 6,357,929 B1 | 3/2002 | Roehrs et al. |
| 6,371,660 B1 | 4/2002 | Roehrs et al. |
| 6,419,402 B1 | 7/2002 | Zimmel |
| 6,427,035 B1 | 7/2002 | Mahony |
| 6,428,215 B1 | 8/2002 | Nault |
| 6,461,057 B2 | 10/2002 | Chen |
| 6,466,725 B2 | 10/2002 | Battey et al. |
| 6,496,641 B1 | 12/2002 | Mahony |
| 6,522,804 B1 | 2/2003 | Mahony |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,568,861 B2 | 5/2003 | Benner et al. |
| 6,579,014 B2 | 6/2003 | Melton et al. |
| 6,614,980 B1 | 9/2003 | Mahony |
| 6,619,697 B2 * | 9/2003 | Griffioen et al. ......... 285/126.1 |
| 6,625,375 B1 | 9/2003 | Mahony |
| 6,629,782 B2 | 10/2003 | McPhee et al. |
| 6,648,520 B2 | 11/2003 | McDonald et al. |
| 6,652,156 B2 | 11/2003 | Shinagawa et al. |
| 6,655,851 B1 | 12/2003 | Lee |
| 6,668,127 B1 | 12/2003 | Mahony |
| 6,678,448 B2 | 1/2004 | Moisel et al. |
| 6,685,361 B1 | 2/2004 | Rubino et al. |
| 6,695,489 B2 | 2/2004 | Nault |
| 6,702,478 B2 | 3/2004 | Inagaki et al. |
| 6,714,710 B2 | 3/2004 | Gimblet |
| 6,739,759 B1 | 5/2004 | Seeley |
| 6,783,281 B2 | 8/2004 | Cheng |
| 6,785,450 B2 | 8/2004 | Wagman et al. |
| 6,789,950 B1 | 9/2004 | Loder et al. |
| 6,817,902 B2 | 11/2004 | Bernardi et al. |
| 6,848,836 B2 | 2/2005 | Ueda et al. |
| 6,899,467 B2 | 5/2005 | McDonald et al. |
| 6,909,821 B2 | 6/2005 | Ravasio et al. |
| 6,916,120 B2 | 7/2005 | Zimmel et al. |
| 6,962,445 B2 | 11/2005 | Zimmel et al. |
| 7,044,650 B1 | 5/2006 | Tran et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,137,742 B2 | 11/2006 | Theuerkorn et al. |
| 7,146,090 B2 | 12/2006 | Vo et al. |
| 7,201,518 B2 | 4/2007 | Holmquist |
| 7,204,644 B2 | 4/2007 | Barnes et al. |
| 7,207,727 B2 | 4/2007 | Tran et al. |
| 7,234,877 B2 | 6/2007 | Sedor |
| 7,244,066 B2 | 7/2007 | Theuerkorn |
| 7,264,402 B2 | 9/2007 | Theuerkorn et al. |
| 7,292,763 B2 | 11/2007 | Smith et al. |
| 7,317,863 B2 | 1/2008 | Lu et al. |
| 7,331,719 B2 | 2/2008 | Manning et al. |
| 7,346,256 B2 | 3/2008 | Marrs et al. |
| 7,380,992 B2 | 6/2008 | Kramer et al. |
| 2001/0012428 A1 | 8/2001 | Nakajima et al. |
| 2001/0036345 A1 | 11/2001 | Gimblet et al. |
| 2002/0022392 A1 | 2/2002 | Below et al. |
| 2002/0062978 A1 | 5/2002 | Sakabe et al. |
| 2002/0081077 A1 | 6/2002 | Nault |
| 2003/0063867 A1 | 4/2003 | McDonald et al. |
| 2003/0094298 A1 | 5/2003 | Morrow et al. |
| 2003/0095754 A1 | 5/2003 | Matsumoto et al. |
| 2003/0095780 A1 | 5/2003 | Chang |
| 2004/0017983 A1 | 1/2004 | Chen et al. |
| 2004/0033028 A1 | 2/2004 | Cheng |
| 2004/0038588 A1 | 2/2004 | Bernardi et al. |
| 2004/0047566 A1 | 3/2004 | McDonald et al. |
| 2004/0120663 A1 | 6/2004 | Lail et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0041928 A1* | 2/2005 | Zimmel et al. ............... 385/55 |
| 2005/0064752 A1 | 3/2005 | Serino |
| 2005/0117850 A1 | 6/2005 | Milette |
| 2005/0232553 A1 | 10/2005 | Holmquist |
| 2006/0056769 A1 | 3/2006 | Khemakhem et al. |
| 2006/0088247 A1 | 4/2006 | Tran et al. |
| 2006/0088248 A1 | 4/2006 | Tran et al. |
| 2006/0089049 A1 | 4/2006 | Sedor |
| 2006/0115219 A1 | 6/2006 | Mudd et al. |
| 2007/0025665 A1 | 2/2007 | Dean, Jr. et al. |
| 2007/0077010 A1 | 4/2007 | Melton et al. |
| 2008/0044137 A1* | 2/2008 | Luther et al. .................. 385/60 |
| 2008/0131132 A1 | 6/2008 | Solheid et al. |
| 2008/0175541 A1 | 7/2008 | Lu et al. |
| 2008/0175542 A1 | 7/2008 | Lu et al. |
| 2008/0175546 A1 | 7/2008 | Lu et al. |

FOREIGN PATENT DOCUMENTS

| | | |
|---|---|---|
| DE | 10 2004 049 697 A1 | 4/2006 |
| EP | 0 156 075 A2 | 10/1985 |
| EP | 0 547 778 A1 | 6/1993 |
| EP | 0 581 527 A1 | 2/1994 |
| EP | 0 689 069 A1 | 12/1995 |
| EP | 0 762 171 A1 | 3/1997 |
| EP | 0 855 610 A2 | 7/1998 |
| EP | 0 856 761 A1 | 8/1998 |

| | | |
|---|---|---|
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 258 758 A2 | 11/2002 |
| EP | 1 333 537 A1 | 8/2003 |
| EP | 1 457 793 A2 | 9/2004 |
| EP | 1 566 674 A1 | 8/2005 |
| GB | 2 154 333 A | 9/1985 |
| JP | 62-54204 | 3/1987 |
| JP | 5-106765 | 4/1993 |
| JP | 2001-116968 | 4/2001 |
| WO | WO 94/15232 | 7/1994 |
| WO | WO 00/31575 | 6/2000 |
| WO | WO 03/073819 A2 | 9/2003 |
| WO | WO 2005/072395 A2 | 8/2005 |

OTHER PUBLICATIONS

U.S. Appl. No. 12/115,982, filed May 6, 2008 entitled "Interface Converter for SC Fiber Optic Connectors".

U.S. Appl. No. 12/203,508, filed Sep. 3, 2008 entitled "Hardened Fiber Optic Connector Compatible with Hardened and Non-Hardened Fiber Optic Adapters".

U.S. Appl. No. 12/203,522, filed Sep. 3, 2008 entitled "Hardened Fiber Optic Connection System".

U.S. Appl. No. 12/203,530, filed Sep. 3, 2008 entitled "Hardened Fiber Optic Connection System with Multiple Configurations".

U.S. Appl. No. 12/203,535, filed Sep. 3, 2008 entitled "Hardened Fiber Optic Connector and Cable Assembly with Multiple Configurations".

Delphi Connection Systems, "Harsh Environment Hermaphroditic Fiber Optic Connectors," 16 pages (© 2002).

Opti Tap™ Connector. An Evolant Solutions Product, 2 pages (Sep. 2005).

Stratos Lightwave™ Brochure, "HDLC Hermaphroditic Butt Joint Connector," 2 pages (Undated).

Stratos Lightwave™ Brochure, "HQLC Hermaphroditic Butt Joint Connector," 2 pages (Undated).

* cited by examiner

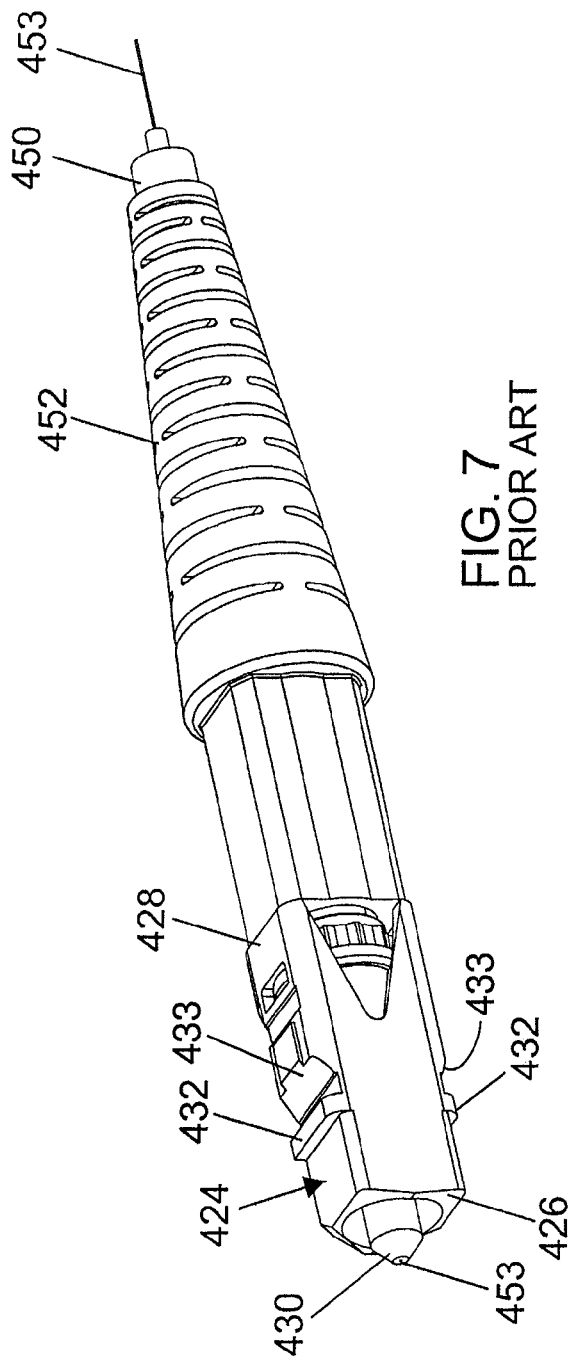
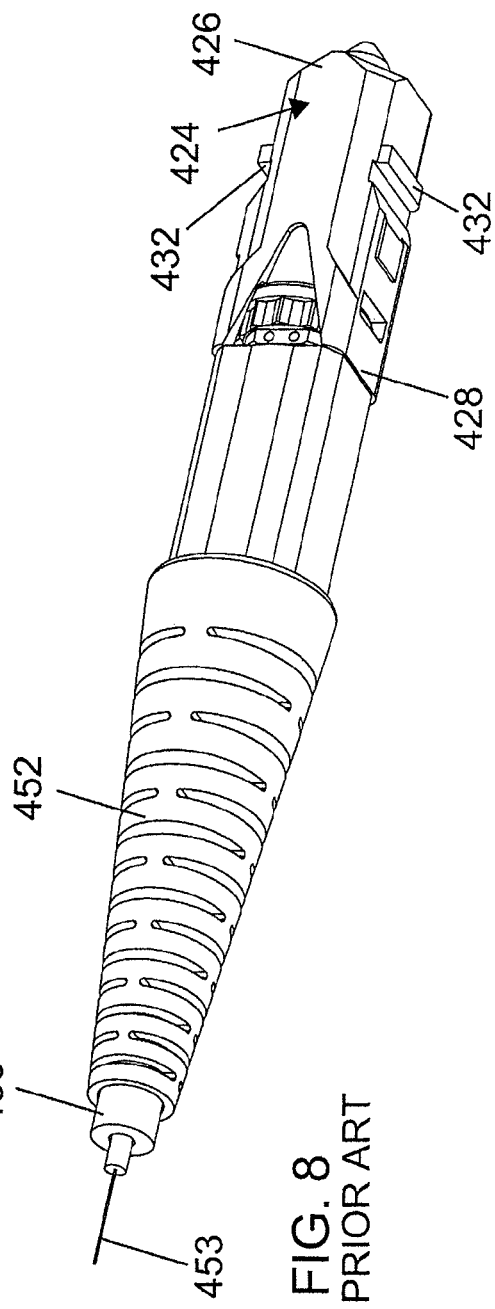
FIG. 7 PRIOR ART
FIG. 8 PRIOR ART

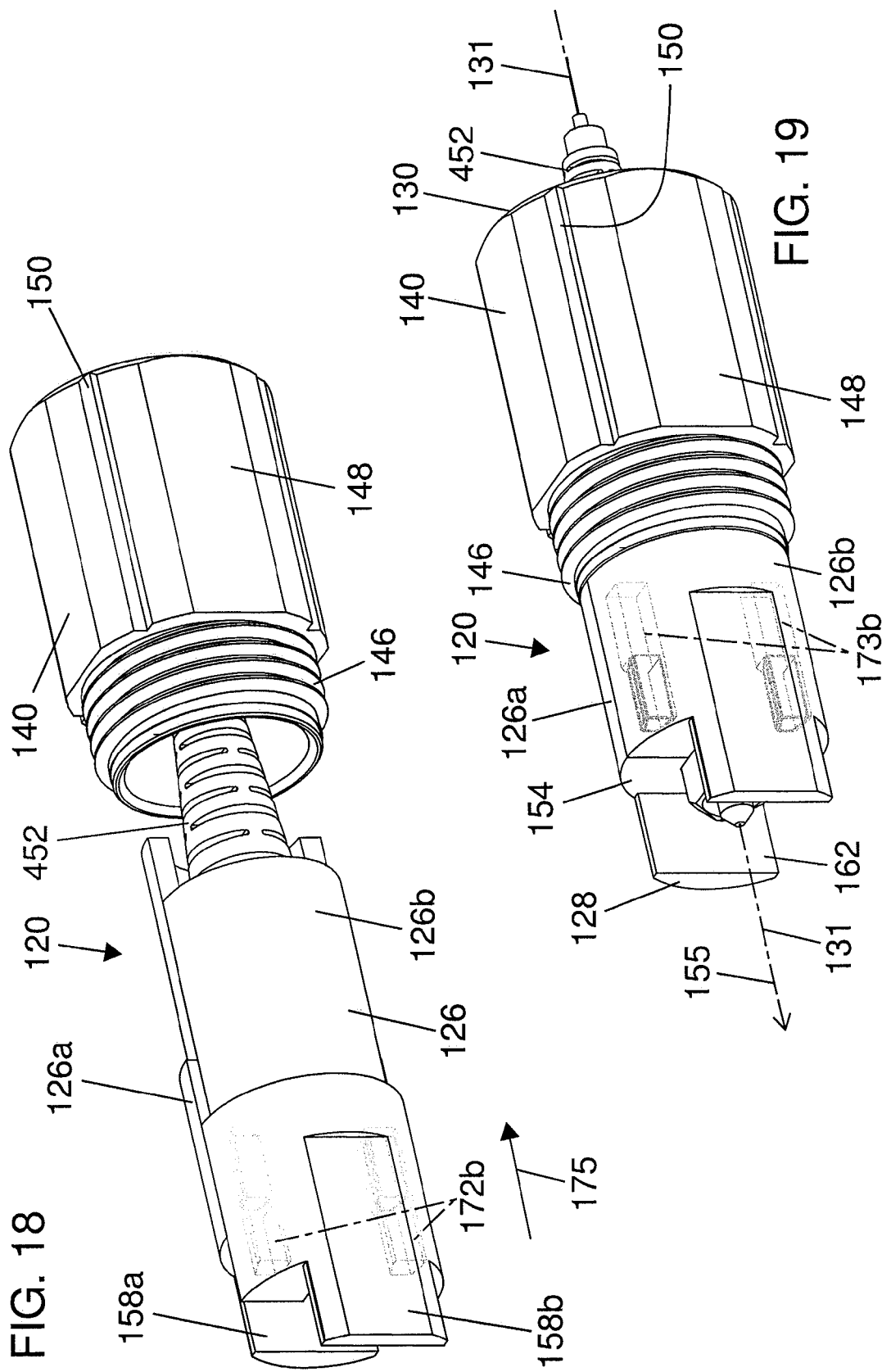

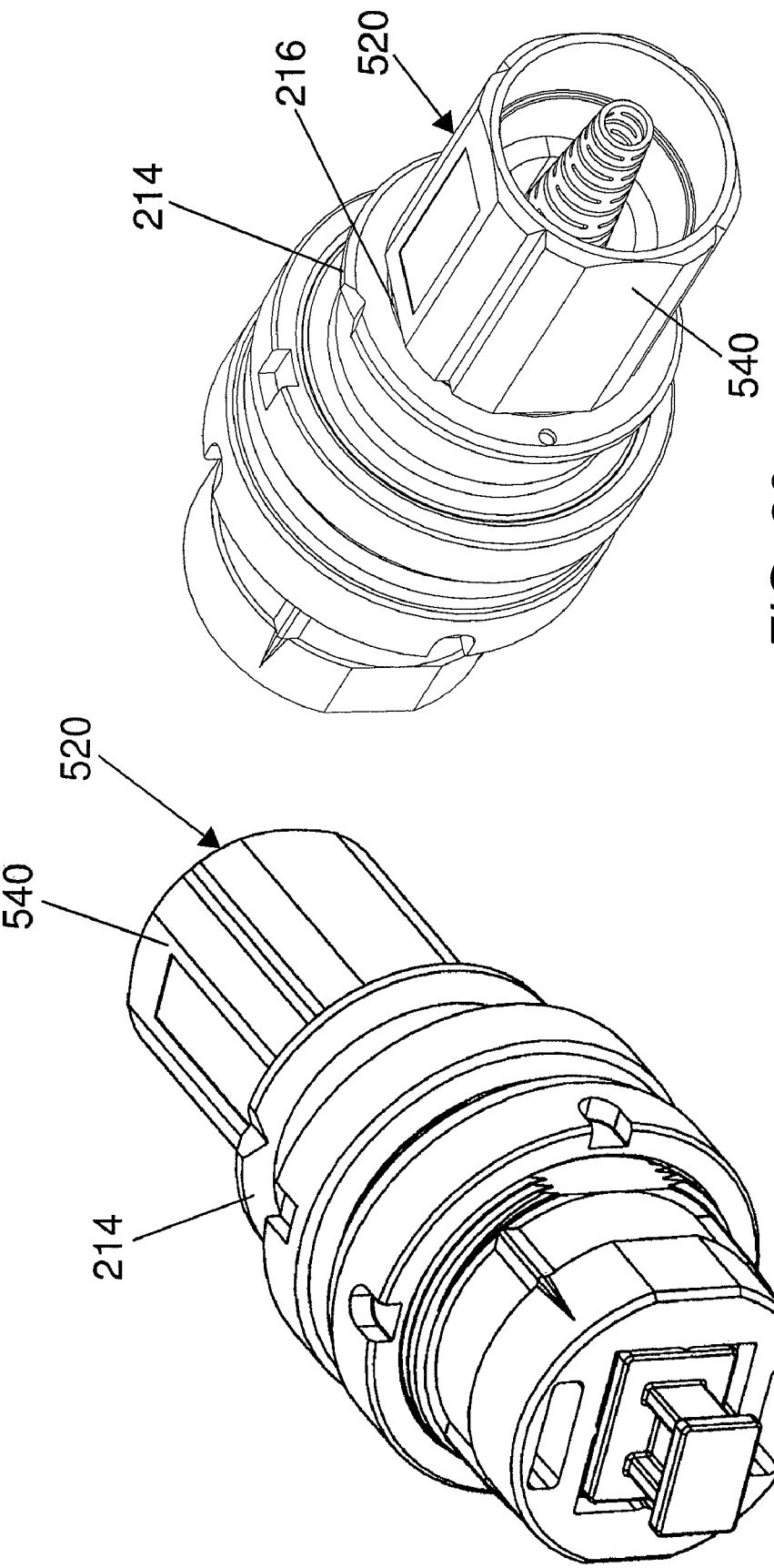

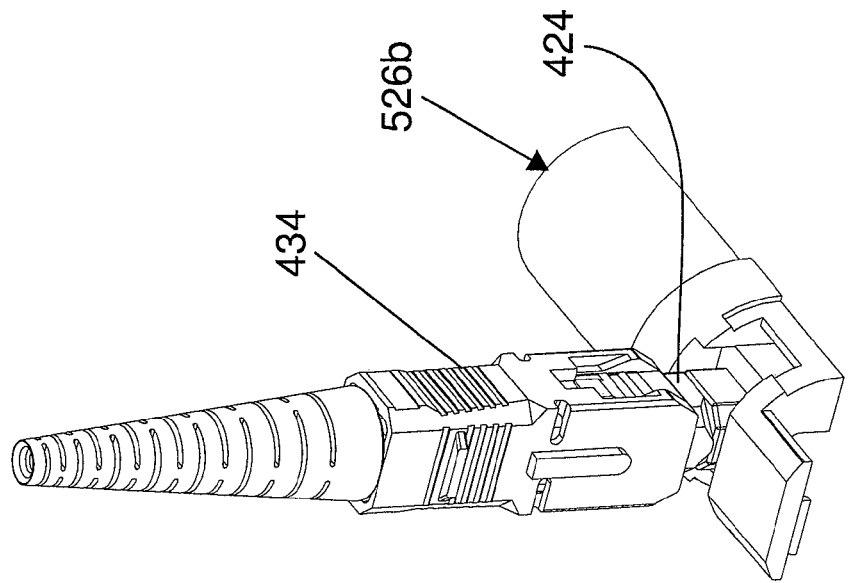
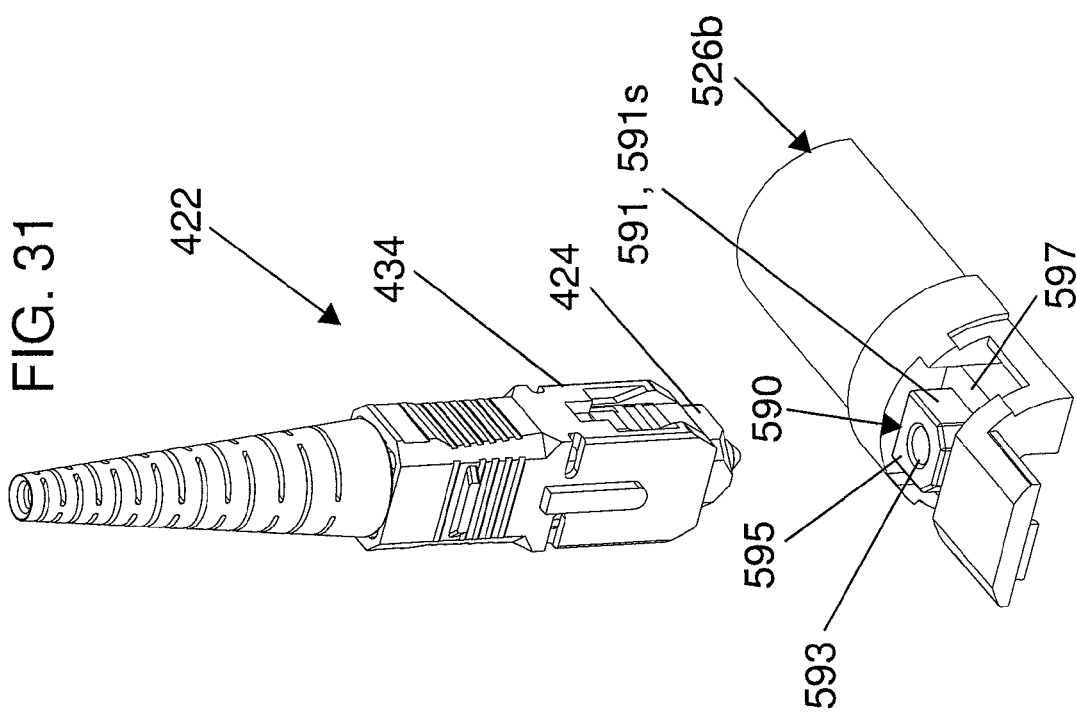
FIG. 31
FIG. 32

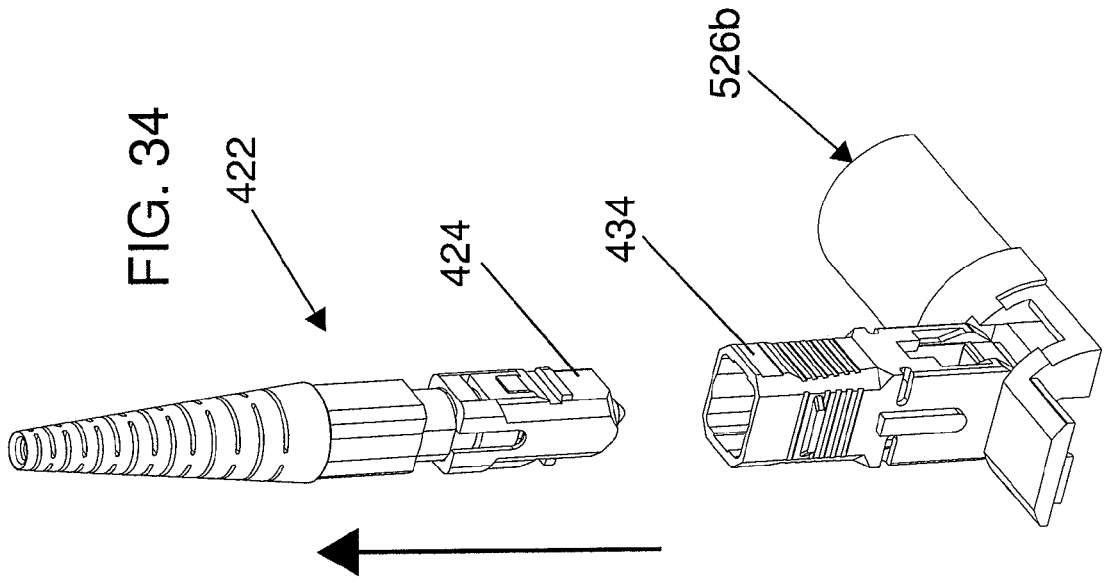
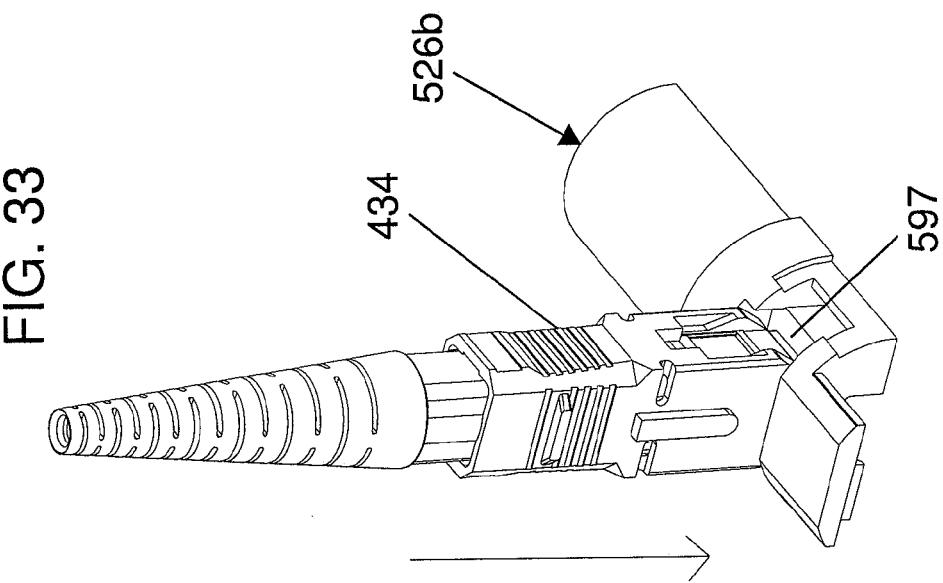

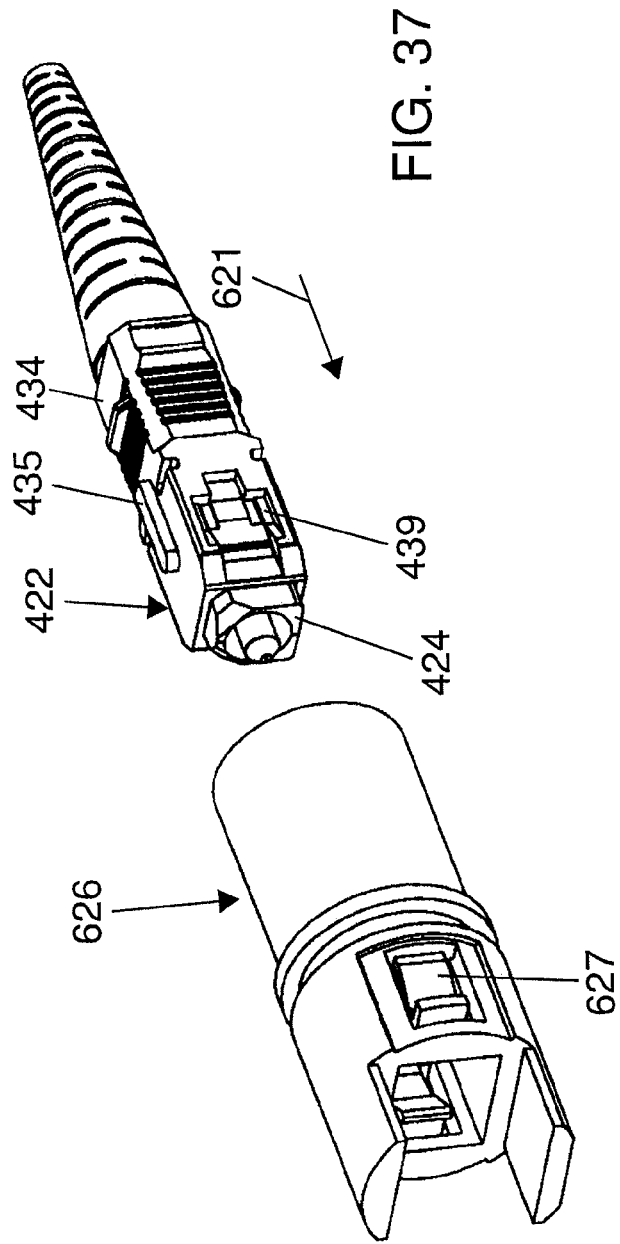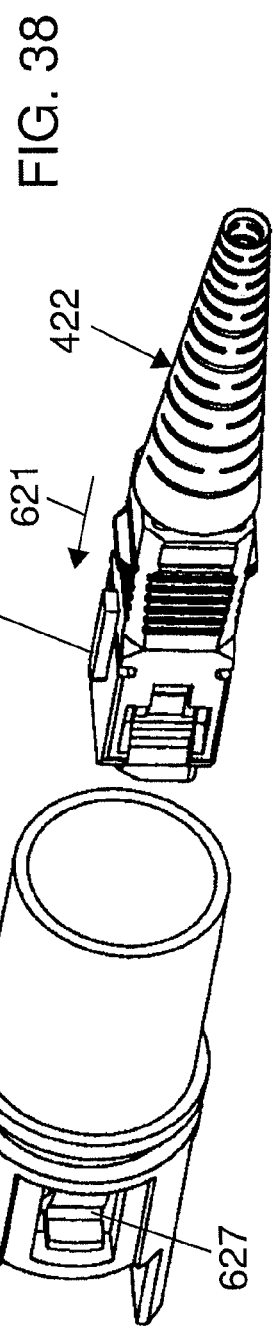

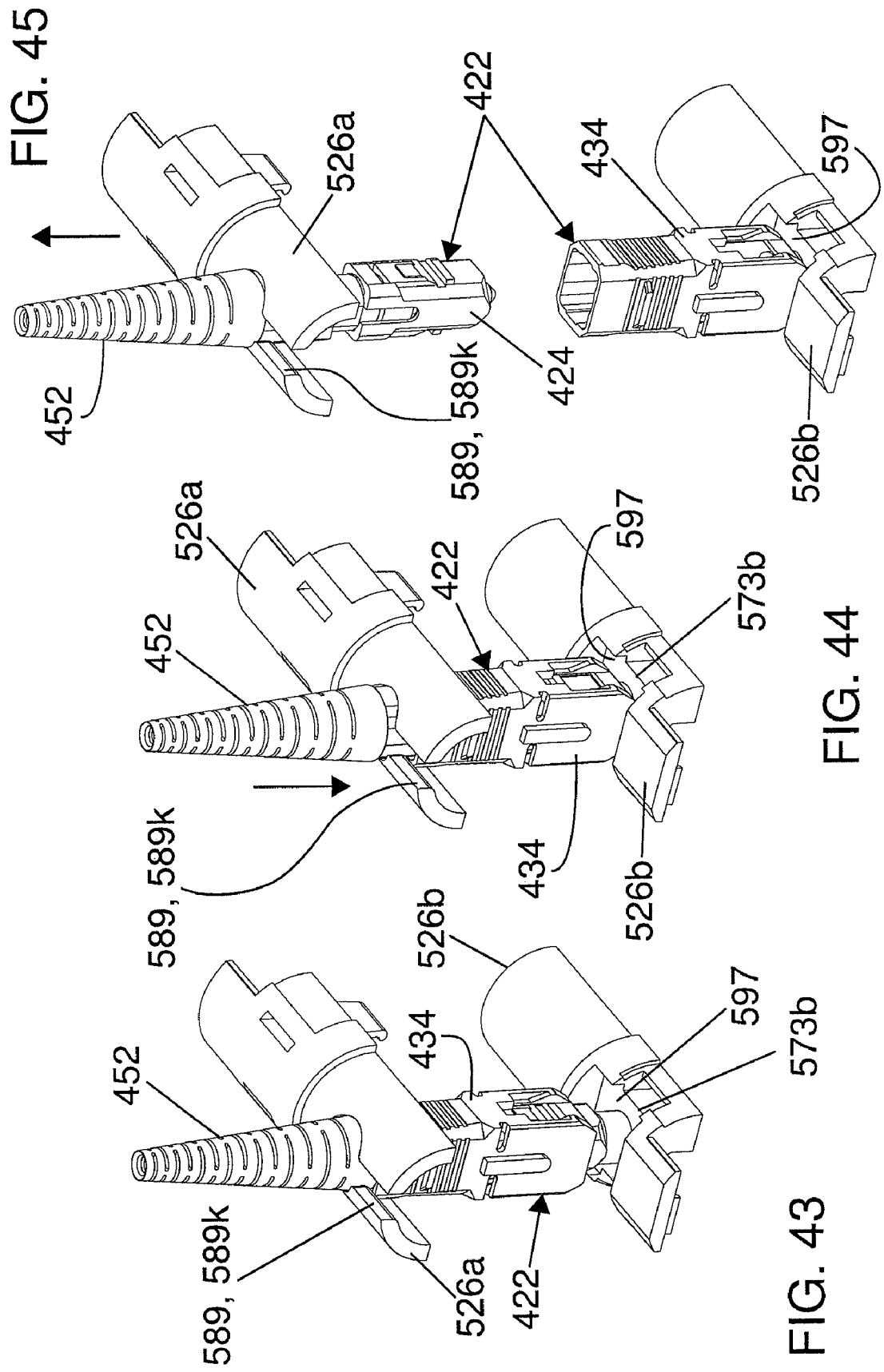

MECHANICAL INTERFACE CONVERTER FOR MAKING NON-RUGGEDIZED FIBER OPTIC CONNECTORS COMPATIBLE WITH A RUGGEDIZED FIBER OPTIC ADAPTER

CROSS-REFERENCE TO RELATED APPLICATIONS

The present application claims the benefit of U.S. Provisional Patent Application Ser. No. 60/916,295, filed May 6, 2007, U.S. Provisional Patent Application Ser. No. 60/948,781, filed Jul. 10, 2007 and U.S. Provisional Patent Application Ser. No. 61/003,948, filed Nov. 21, 2007, which applications are hereby incorporated by reference in their entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal split sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter.

Certain fiber optic cable connection systems can be "ruggedized" or "hardened." The terms "ruggedized" or "hardened" apply to systems that are robust and suitable for use in an outside environment. An example of an existing ruggedized fiber optic connection system is described in U.S. Pat. Nos. 6,579,014, 6,648,520, and 6,899,467.

Ruggedized fiber optic cable connection systems can include fiber optic adapters that are mounted to outside fiber optic enclosures such as drop terminals, network interface devices, splice enclosures or other housings/enclosures. FIG. 1 shows a fiber optic drop terminal 210 including a front face at which a plurality of ruggedized fiber optic adapters 214 are mounted. The ruggedized fiber optic adapters 214 include inner ports configured to receive non-ruggedized fiber optic connectors and outer ports 216 configured to receive ruggedized fiber optic connectors 322. The inner ports are accessible from inside the drop terminal 210 and the outer ports 216 are accessible from outside the drop terminal 210. Further details regarding drop terminals and their applications in fiber optic networks are disclosed at U.S. patent application Publication Numbers US 2005/0213921, now U.S. Pat. No. 7,292,763, and US 2006/0093303, now U.S. Pat. No. 7,489,849, that are hereby incorporated by reference in their entireties.

FIG. 2 illustrates one of the fiber optic adapters 214 in isolation from the drop terminal 210. The fiber optic adapter 214 includes a ruggedized housing 240 having a first piece 242 that defines the inner port 218 of the fiber optic adapter 214 and a second piece 244 that defines the outer port 216 of the fiber optic adapter 214. The first and second pieces 242, 244 can be interconnected by a snap-fit connection to form the ruggedized housing 240. An interior adapter housing 246 mounts inside the ruggedized housing 240. Springs 248 bias the interior adapter housing 246 toward the outer port 216 and allow the interior adapter housing 246 to float within the interior of the ruggedized housing 240. As shown at FIG. 3, the interior adapter housing 246 includes a cylindrical split sleeve holder 251 that houses a standard split sleeve 250. The split sleeve 250 is coaxially aligned with a center axis 252 of the fiber optic adapter 214. The split sleeve 250 includes an inner end 254 that faces toward the inner port 218 of the fiber optic adapter 214 and an outer end 256 that faces toward the outer port 216 of the fiber optic adapter 214. The fiber optic adapter 214 defines a plurality of internal threads 272 within the outer port 216 for use in securing a ruggedized fiber optic connector within the outer port 216. The fiber optic adapter 214 also includes resilient latches 273 for retaining a non-ruggedized fiber optic connector (e.g., a standard SC connector) within the inner port 218. The latches 273 are located adjacent the inner port 218. The interior adapter housing 246 also defines a keying slot 247 adjacent the inner port 218 for ensuring that the non-ruggedized fiber optic connector is inserted into the inner port 218 at the proper rotational orientation. Resilient latches are not provided at the outer port 216. A dust plug 270 is mounted within the outer port 216 of the fiber optic adapter 214 to prevent the adapter from being contaminated when no connector is inserted in the outer port 216.

FIG. 4 illustrates one of the ruggedized fiber optic connectors 322 adapted to be inserted in the outer port 216 of the fiber optic adapter 214. The fiber optic adapter 322 includes an outer housing 328 and a connector body 330. The connector body 330 supports a ferrule 332 located at a connector interface end 326 of the fiber optic connector 322. The outer housing 328 of the fiber optic connector 322 is elongated along a central axis 340 and includes a first end 342 positioned opposite from a second end 344. The first end 342 of the outer housing 328 is positioned at the connector interface end 326 of the fiber optic connector 322 and includes a pair of opposing extensions or paddles 346 positioned on opposite sides of the connector interface housing 330. The paddles 346 are generally parallel to the central axis 340 and are separated from one another by a gap 348 in which the connector body 330 is located. The paddles 346 have different shapes and mate with corresponding regions of the outer port 216 to provide a keying function for ensuring that the fiber optic connector 322 is mounted at the proper rotational orientation within the outer port 216. The second end 344 of the outer housing 328 is adapted to receive a fiber optic cable 350 having a fiber 353 that terminates in the ferrule 332. A resilient boot 352 can be positioned over the second end 344 of the outer housing 328 to provide bend radius protection at the interface between the outer housing 328 and the fiber optic cable 350.

Referring still to FIG. 4, the fiber optic connector 322 also includes a retention nut 358 rotatably mounted about the exterior of the outer housing 328. The retention nut 358 is free to be manually turned relative to the outer housing 328 about the central axis 340. The retention nut 358 includes an externally threaded portion 362 and a gripping portion 364. The gripping portion 364 includes a plurality of flats that allow the gripping portion 364 to be easily grasped to facilitate manually turning the retention nut 358 about the central axis 340. To secure the fiber optic connector 322 within the outer port 216 of the fiber optic adapter 214, the threaded portion 362 is threaded into the inner threads 272. When the fiber optic connector 322 is secured within the outer port, the ferrule 332 fits within the outer end 256 of the split sleeve 250 of the fiber optic adapter 214.

FIGS. 5 through 8 show a standard non-ruggedized SC fiber optic connector 422 adapted to be inserted in the inner port 218 of the fiber optic adapter 214. The connector 422 includes a connector body 424 in which a ferrule assembly is mounted. The connector body 424 includes a first end 426 positioned opposite from a second end 428. The first end 426 provides a connector interface at which a ferrule 430 of the ferrule assembly is supported. Adjacent the first end 426, the connector body 424 includes retention shoulders 432 that are engaged by the resilient latches 273 of the adapter 214 when the connector 422 is inserted in the inner port 218. The latches 273 function to retain the connector 422 within the inner port 218. The second end 428 of the connector body 424 is adapted to receive a fiber optic cable 450 having a fiber 453 that terminates in the ferrule 430. A resilient boot 452 can be positioned at the second end 428 of the connector body 424 to provide bend radius protection at the interface between the connector body 424 and the fiber optic cable 450.

The connector 422 also includes a retractable release sleeve 434 that mounts over the connector body 424. The release sleeve 434 can be slid back and forth relative to the connector body 424 through a limited range of movement that extends in a direction along a longitudinal axis 454 of the connector 422. The release sleeve 434 includes release ramps 436 that are used to disengage the latches 273 from the retention shoulders 432 when it is desired to remove the connector 422 from the inner port 218. For example, by pulling back (i.e., in a direction toward the second end 428 of the connector body 424) on the retention sleeve 434 while the connector 422 is mounted in the inner port 218, the release ramps 436 force the latches 273 apart from one another a sufficient distance to disengage the latches 273 from the retention shoulders 432 so that the connector 422 can be removed from the inner port 218. The release sleeve 434 includes a keying rail 435 that fits within the keying slot 247 of the interior adapter housing 246 to ensure proper rotational alignment of the connector 422 within the inner port 218. When the connector 422 is latched within the inner port 218, the ferrule 430 fits within the inner end 254 of the split sleeve 250 of the fiber optic adapter 214. Further details regarding SC type fiber optic connectors are disclosed at U.S. Pat. No. 5,317,663, that is hereby incorporated by reference in its entirety.

For some applications, there exists a desire to insert non-ruggedized connectors into ruggedized adapter ports. A prior art technique for accommodating this need involves removing the interior adapter housing 246 from the ruggedized housing 240 and replacing the interior adapter housing 246 with a standard SC adapter housing (e.g., see U.S. Pat. No. 5,317,663, that was previously incorporated by reference in its entirety). The standard SC adapter housing is secured within the ruggedized housing 240 with a potting material. However, this process is time consuming and requires the fiber optic adapter 214 to be disassembled. There is a need for improved techniques for providing compatibility between ruggedized and non-ruggedized fiber optic components.

SUMMARY

One aspect of the present disclosure relates to an interface converter for allowing a non-ruggedized fiber optic connector to be compatible with a ruggedized adapter port.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a front, top perspective view of the standard non-ruggedized SC fiber optic connector of FIGS. 5 and 6 with an outer release sleeve removed;

FIG. 8 is a rear, bottom perspective view of the standard non-ruggedized SC fiber optic connector of FIGS. 5 and 6 with the outer release sleeve removed;

FIG. 18 is a front, side perspective view showing a second assembly step of the interface converter of FIG. 16 and the standard non-ruggedized SC fiber optic connector of FIGS. 7 and 8;

FIG. 19 is a front, side perspective view showing a third assembly step of the interface converter of FIG. 16 and the standard non-ruggedized SC fiber optic connector of FIGS. 7 and 8;

FIG. 25 is a first end view of a fiber optic adapter with the interface converter of FIG. 24 inserted therein;

FIG. 26 is a second end view of the fiber optic adapter of FIG. 25 with the interface converter of FIG. 24 inserted therein;

FIG. 31 shows an SC connector in alignment with a release sleeve removal tool that is integral with the interface converter housing of the interface converter;

FIG. 32 shows the SC connector of FIG. 31 with a ferrule of the connector inserted within a clearance opening of the release sleeve removal tool;

FIG. 33 shows the SC connector of FIG. 31 with a release sleeve being forced downwardly into a recess of the release sleeve removal tool to cause the release sleeve to disengage from the connector body of the SC connector;

FIG. 34 shows the SC connector of FIG. 31 with the connector body being withdrawn from the release sleeve;

FIG. 37 is a front, side perspective view showing an SC connector in alignment behind the converter housing of FIG. 35;

FIG. 38 is a rear, side perspective view showing the SC connector in alignment behind the converter housing of FIG. 35;

FIG. 43 shows the SC connector of FIG. 31 with the ferrule of the connector inserted within the clearance opening of the release sleeve removal tool of FIG. 41 and a pushing tool mounted over the release sleeve;

FIG. 44 shows the SC connector of FIG. 31 with the release sleeve being forced downwardly by the pushing tool of FIG. 43 into a recess of the release sleeve removal tool of FIG. 41 to cause the release sleeve to disengage from the connector body of the SC connector;

FIG. 45 shows the SC connector of FIG. 31 with the connector body being withdrawn from the release sleeve by the pushing tool of FIG. 43;

DETAILED DESCRIPTION

Figure 1:
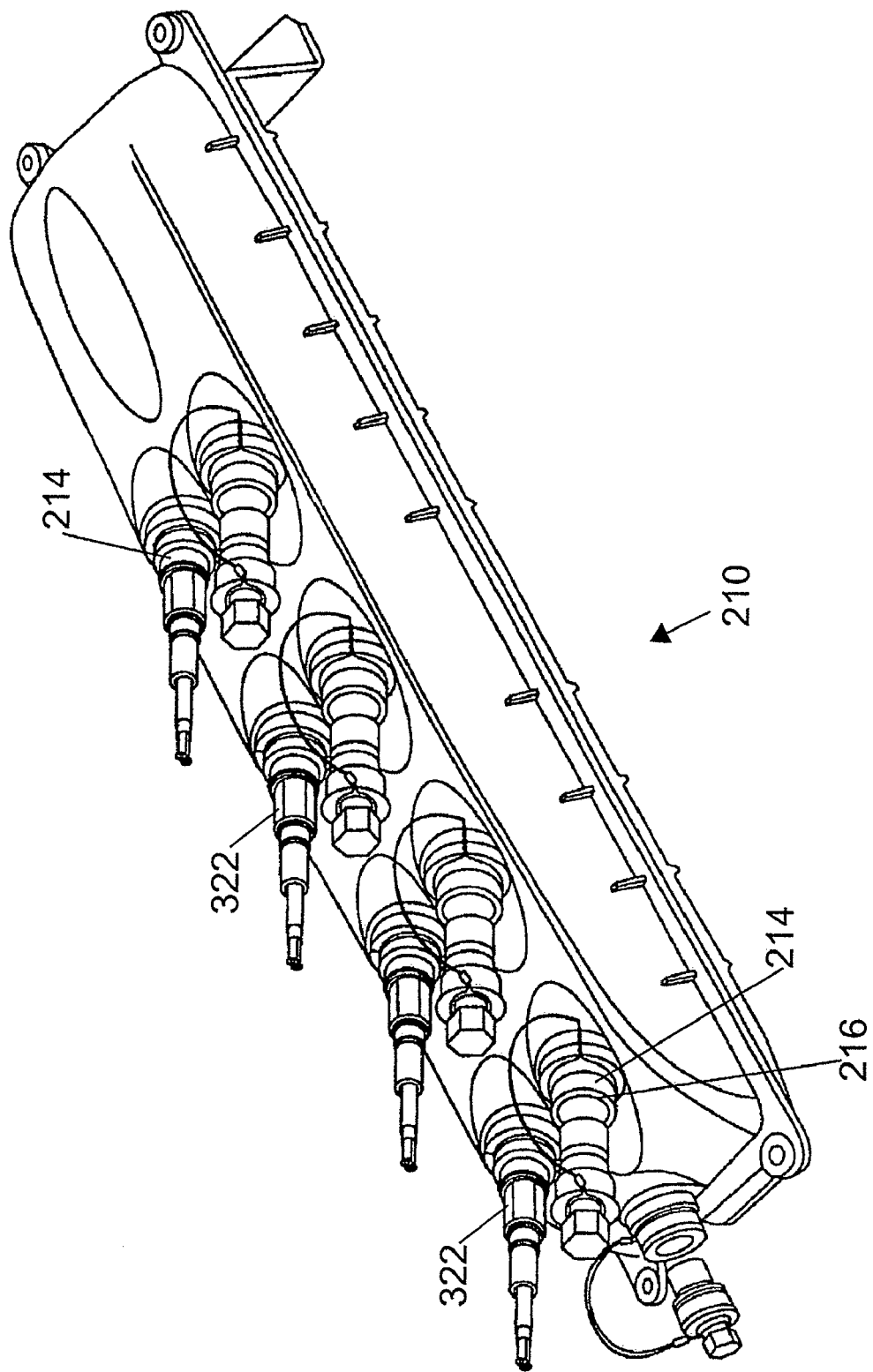
FIG. 1 is a perspective view of a prior art drop terminal having ruggedized fiber optic adapters.
Figure 2:
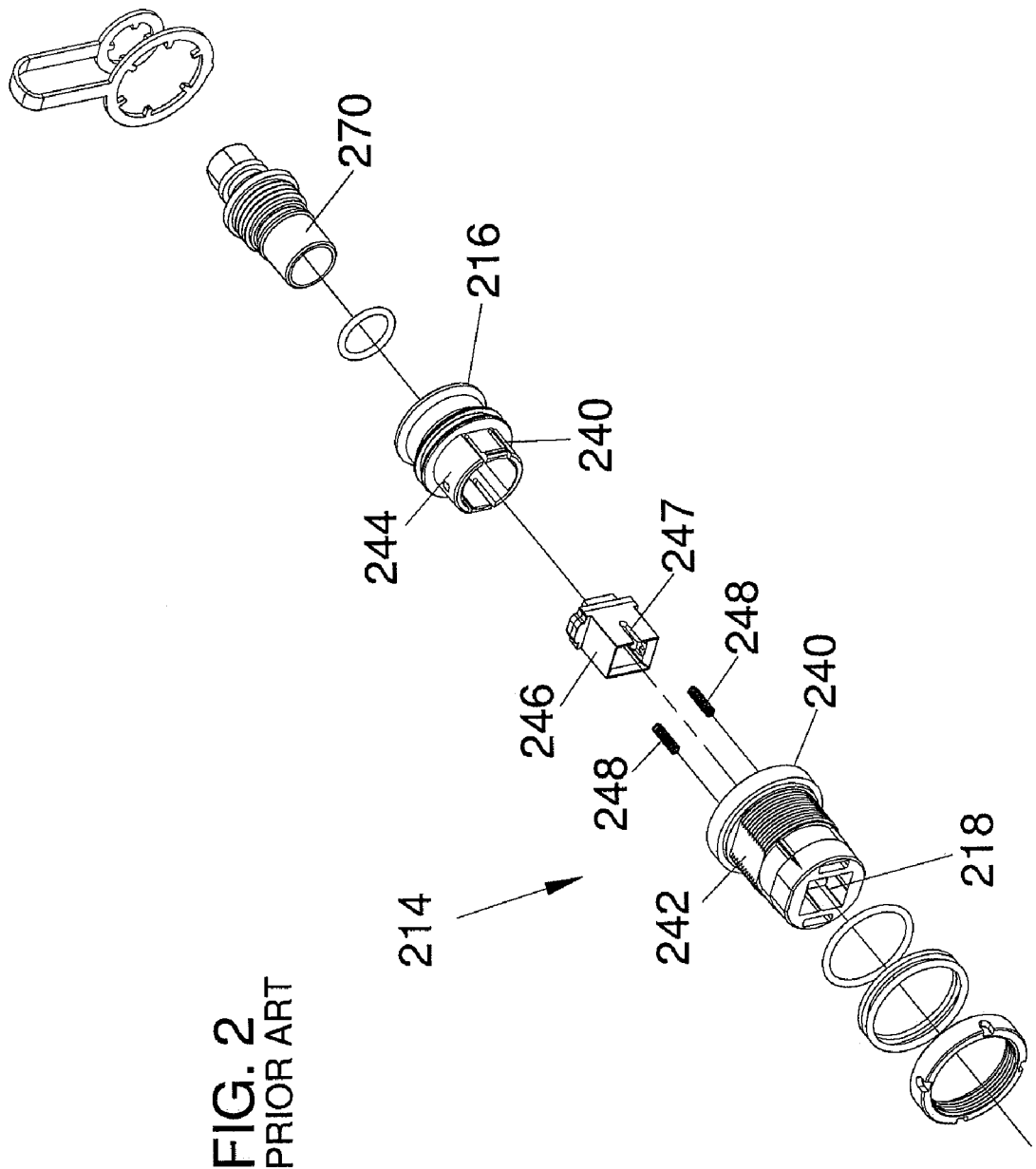
FIG. 2 is an exploded view of a ruggedized fiber optic adapter of the type mounted on the drop terminal of FIG. 1.
Figure 3:
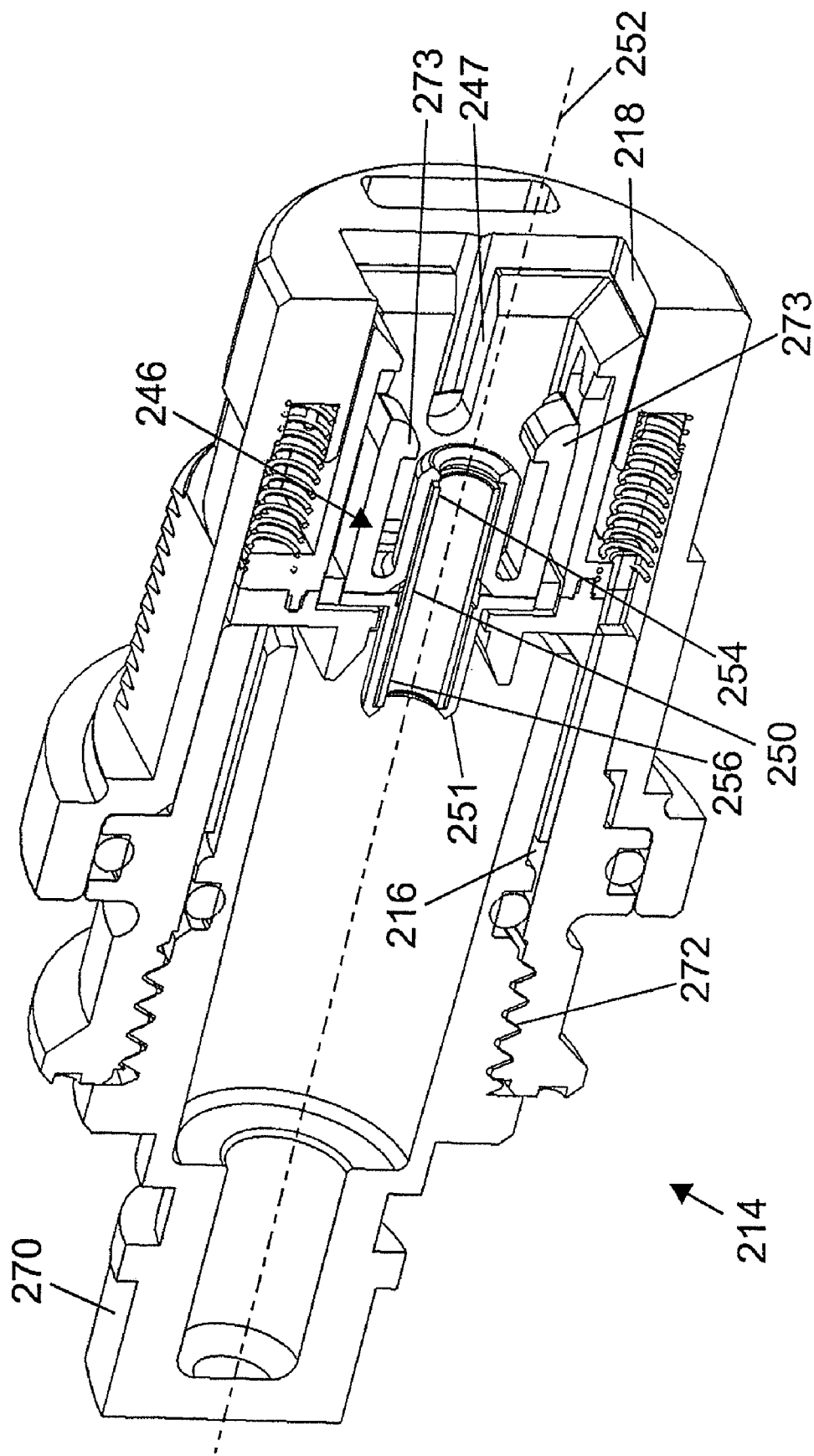
FIG. 3 is a perspective cut-away view cut lengthwise through the ruggedized fiber optic adapter of FIG. 2.
Figure 4:
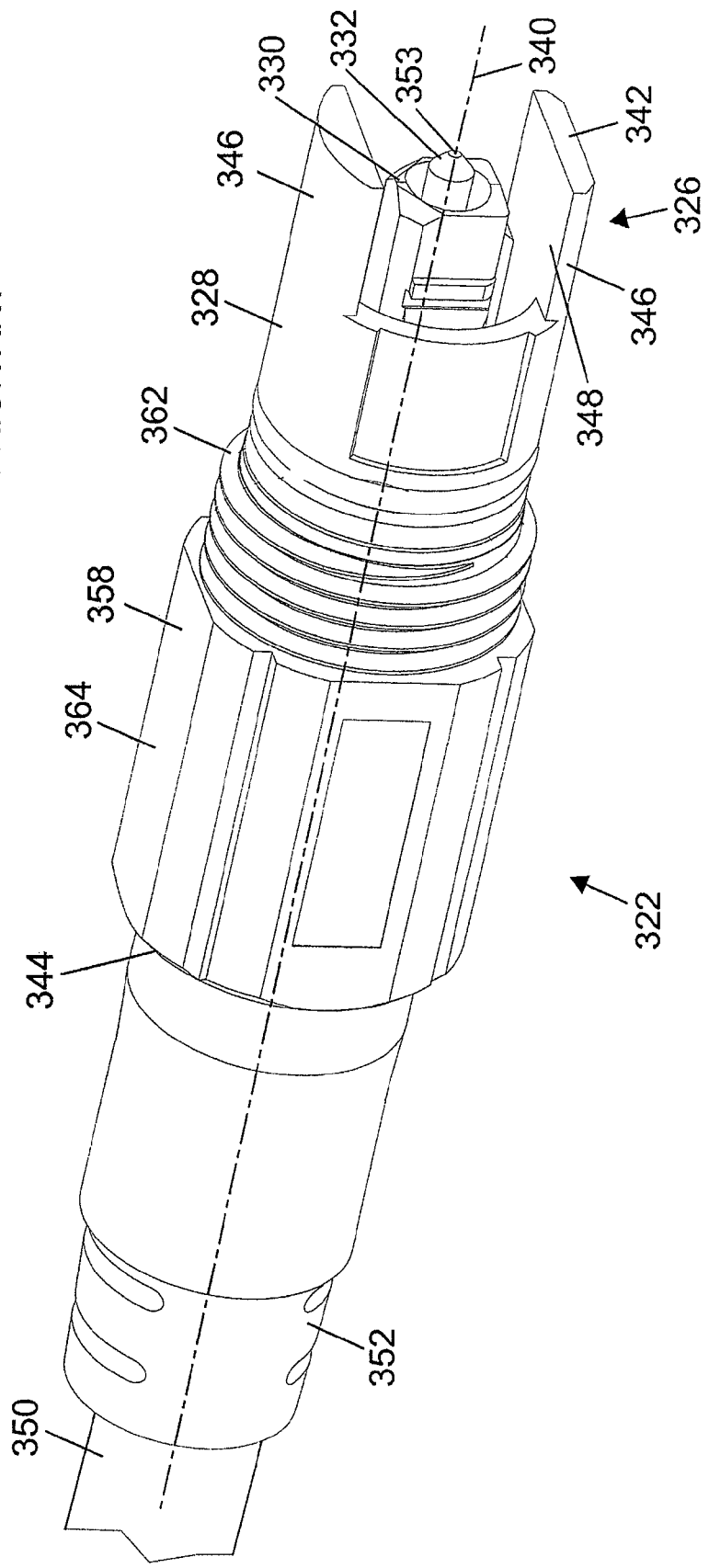
FIG. 4 is a perspective view of a ruggedized fiber optic connector adapter to be inserted in an outer port of the ruggedized fiber optic adapter of FIGS. 2 and 3.
Figure 5:
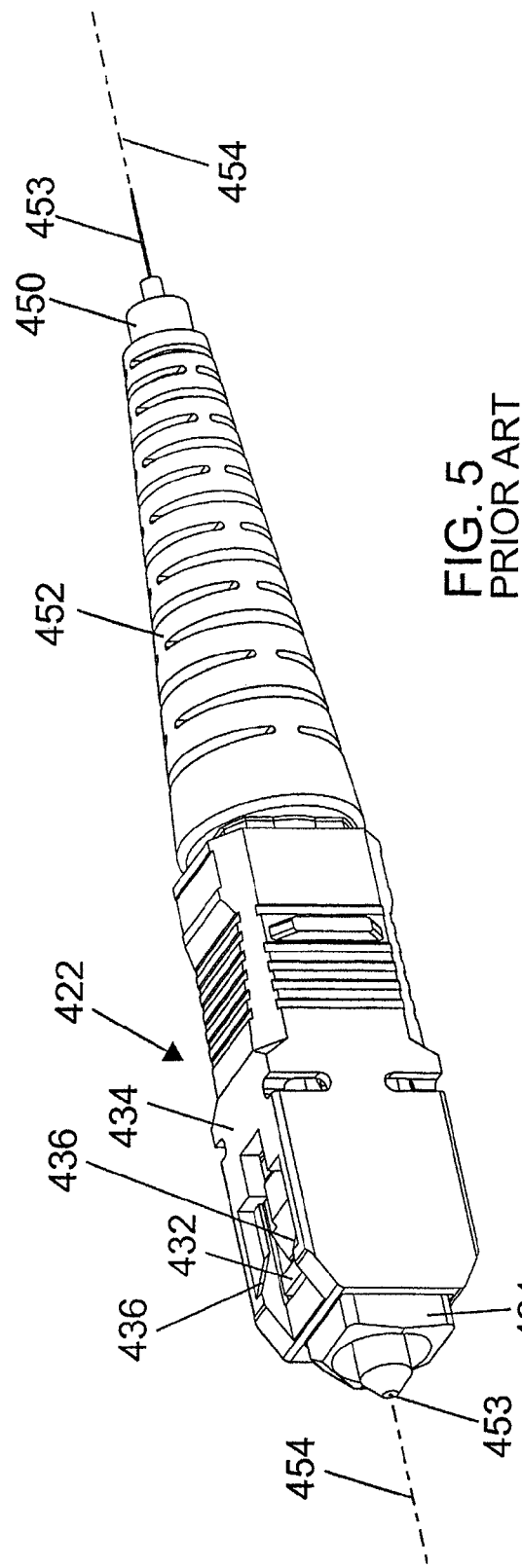
FIG. 5 is a front, top perspective view of a standard non-ruggedized SC fiber optic connector adapted to be inserted in an inner port of the fiber optic adapter of FIGS. 2 and 3.
Figure 6:
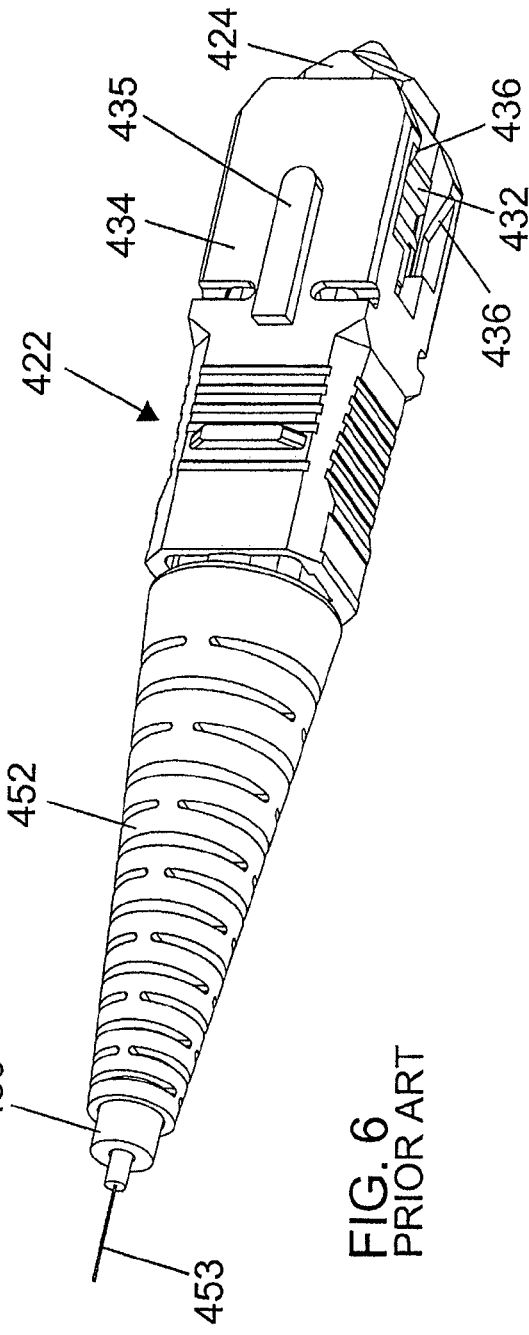
FIG. 6 is a rear, bottom perspective view of the standard non-ruggedized SC fiber optic connector of FIG. 5.

FIGS. 9 through 15 show an interface converter 20 having features that are examples of inventive aspects in accordance with the principles of the present disclosure. The interface converter 20 is configured to make a non-ruggedized fiber optic connector (e.g., the fiber optic connector 422 of FIGS. 5 through 8) compatible with the ruggedized outer port 216 of the fiber optic adapter 214 of FIGS. 2 and 3. The interface converter 20 mounts within the ruggedized outer port 216 and provides a mechanical interface suitable for receiving and retaining the fiber optic connector 422 within the outer port 216. The interface converter 20 also functions to align the fiber optic connector 422 within the outer port 216 such that the ferrule 430 fits within the outer end 256 of the split sleeve 250 of the fiber optic adapter 214. In addition, the interface converter 20 rotationally orients the fiber optic connector 422 within the outer port 216 such that the keying rail 435 is seated in a keying groove 38 of the interface converter 20 and opposing paddles 30 of the interface converter 20 fit within corresponding receivers defined within the outer port 216.

Figure 9:
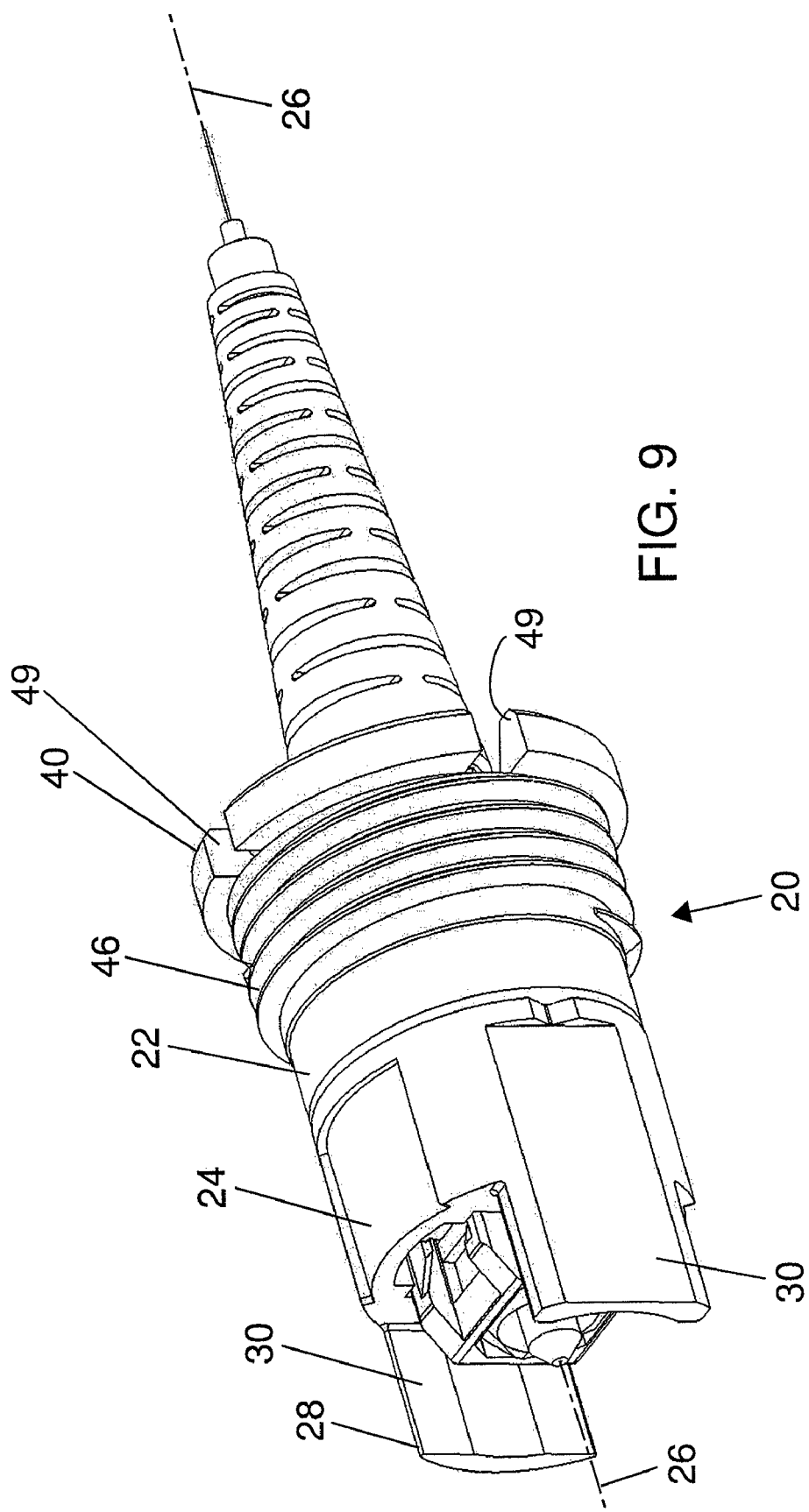
FIG. 9 is a front, top perspective view of the standard non-ruggedized SC fiber optic connector inserted in an interface converter.
Figure 10:
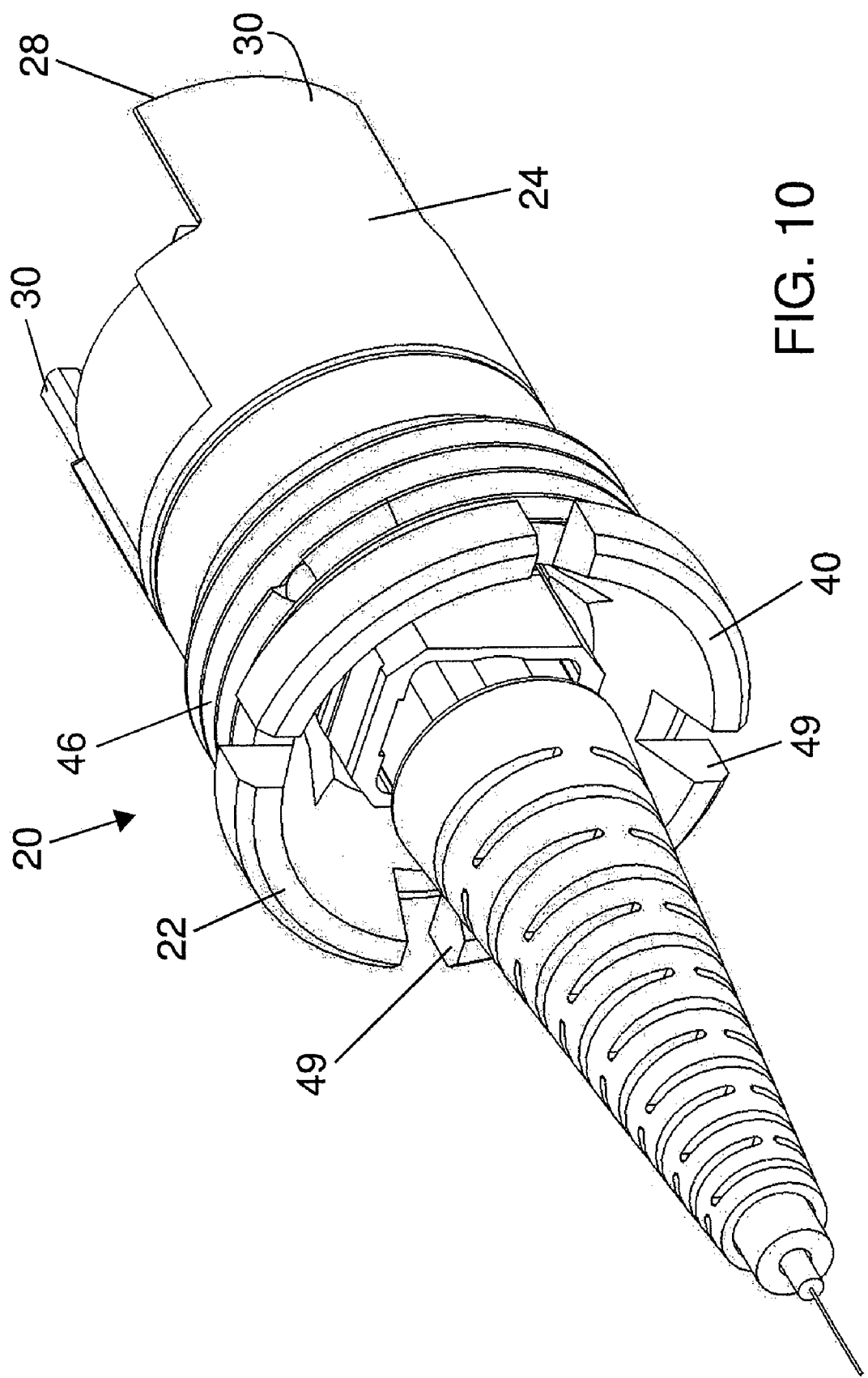
FIG. 10 is a rear, top perspective view of the standard non-ruggedized SC fiber optic connector inserted in the interface converter of FIG. 9.

Referring to FIG. 9, the interface converter 20 includes an anchoring piece 22 connected to a connector holder 24 (e.g., by a snap fit connection). The anchoring piece 22 and the connector holder 24 are both aligned along a central longitudinal axis 26 of the interface converter 20. The anchoring piece 22 can be manually rotated relative to the connector holder 24 about the central longitudinal axis 26.

Figure 11:
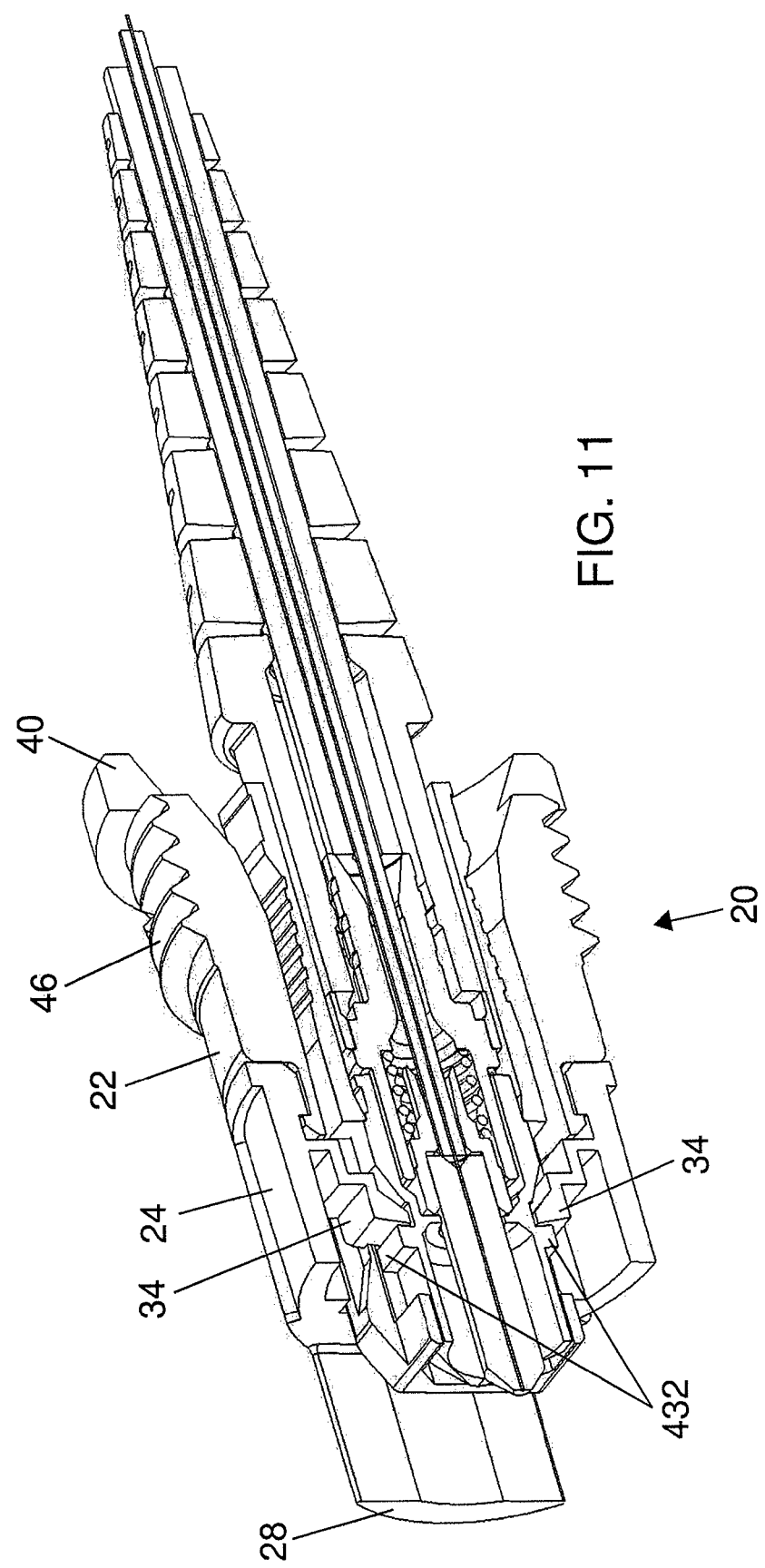
FIG. 11 is a front, top perspective cut-away view cut lengthwise through the standard non-ruggedized SC fiber optic connector inserted in the interface converter of FIG. 9.
Figure 12:
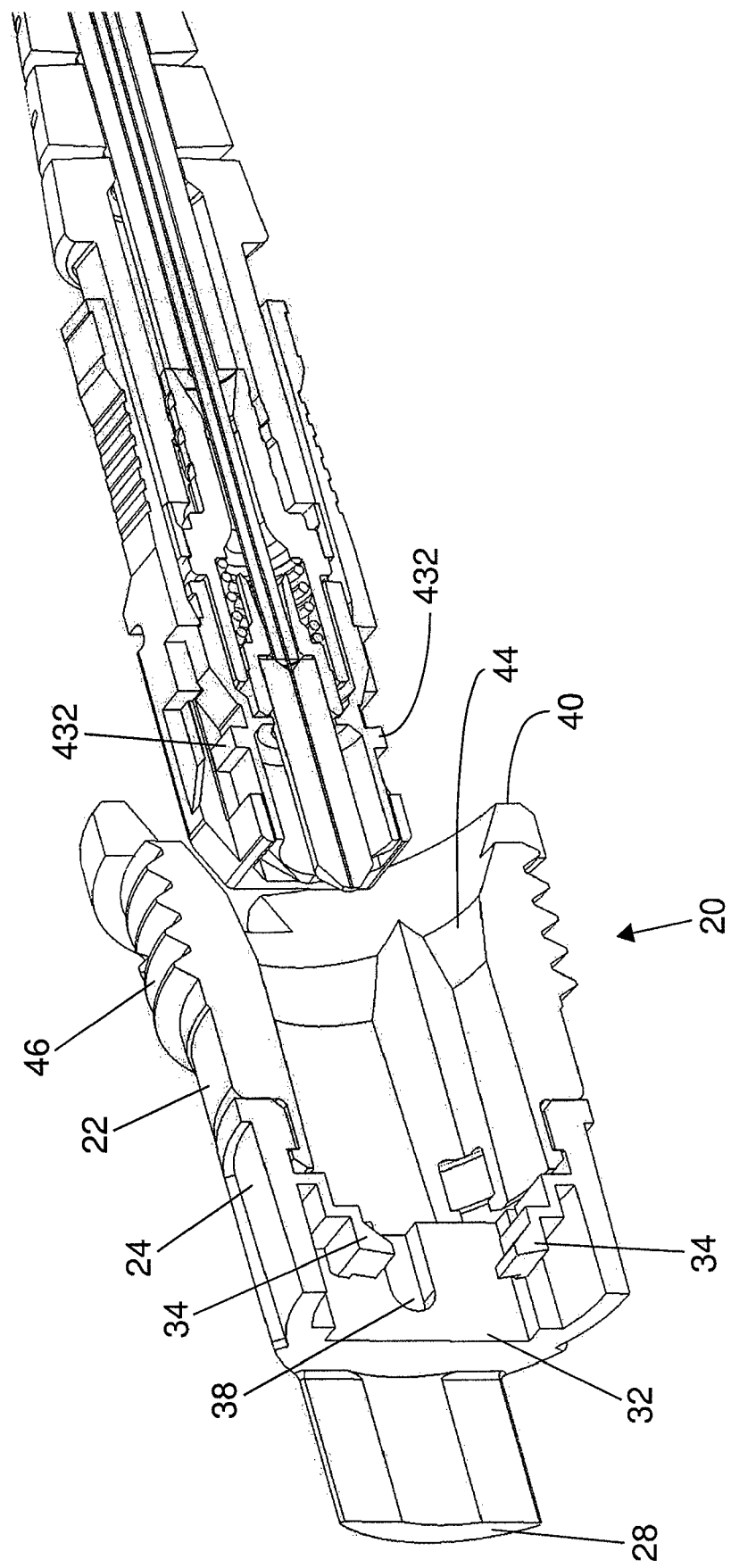
FIG. 12 is a front, top perspective cut-away view cut lengthwise through the standard non-ruggedized SC fiber optic connector withdrawn from the interface converter of FIG. 9.
Figure 13:
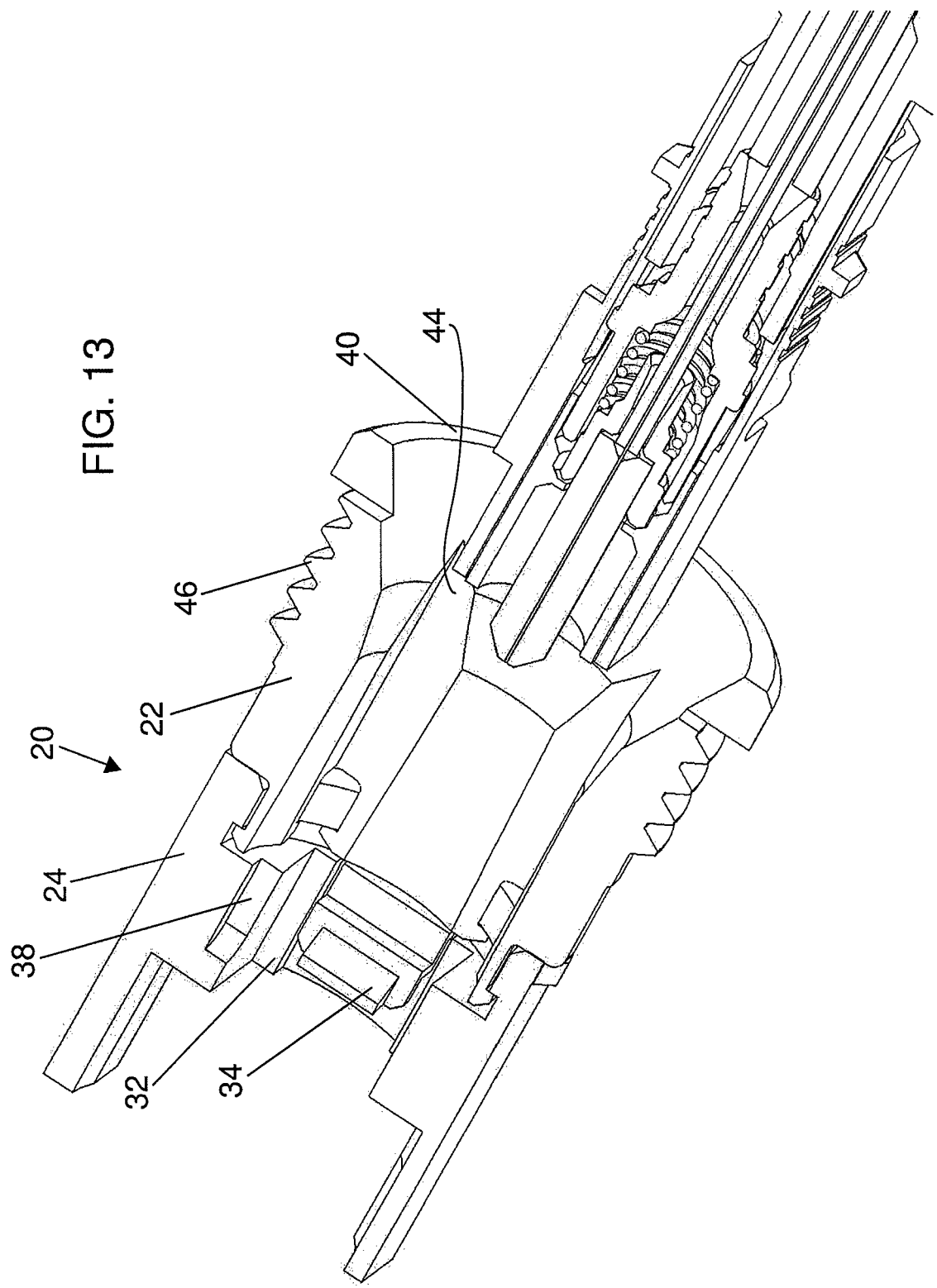
FIG. 13 is a rear, top perspective cut-away view cut lengthwise along the middle through the standard non-ruggedized SC fiber optic connector withdrawn from the interface converter of FIG. 9.

The connector holder 24 forms a first end 28 of the interface converter and is shaped with a mechanical interface that complements or is compatible with the inner shape defined within the ruggedized outer port 216 of the fiber optic adapter 214. For example, the connector holder 24 includes the opposing paddles 30 that fit within the corresponding receivers defined within the outer port 216 to ensure proper rotational alignment between the connector holder 24 and the outer port 216. The connector holder 24 is configured to receive and retain the fiber optic connector 422. For example, the connector holder 24 defines a central passage 32 shaped and sized to accommodate the outer shape of the release sleeve 434 of the fiber optic connector 422. In this way, the connector 422 can be received within the central passage 32. The connector holder 24 also includes structure for mechanically retaining the fiber optic connector 422 within the central passage 32. For example, as shown in FIGS. 11 through 13, the connector holder 24 includes opposing flexible latches 34 configured to interlock with the retention shoulders 432 of the fiber optic connector 422 when the fiber optic connector 422 is inserted in the central passage 32. The interlock between the latches 34 and the retention shoulders 432 functions to retain the fiber optic connector 422 within the central passage 32. The latches 34 can be disengaged from the retention shoulders 432 by pulling back on the release sleeve 434 thereby causing the ramped surfaces 436 (see FIG. 5) of the release sleeve 434 to force the latches 34 apart a sufficient distance to disengage the latches 34 from the retention shoulders 432.

The anchoring piece 22 forms a second end 40 of the interface converter 20. The second end 40 is positioned opposite from the first end 28. The anchoring piece 22 defines a central passage 44 that aligns with the central passage 32 of the connector holder 24. In one embodiment, the central passage 44 is tapered at the second end 40 to provide a transition or lead-in for facilitating inserting the fiber optic connector 422 into the central passage 44. The anchoring piece 22 also includes external threads 46 sized to match or intermate with the internal threads 272 provided within the outer port 216 of the fiber optic adaptor 214. By threading the anchoring piece 22 within the internal threads 272, the interface converter can be anchored within the outer port 216 of the fiber optic adapter 214.

Figure 14:
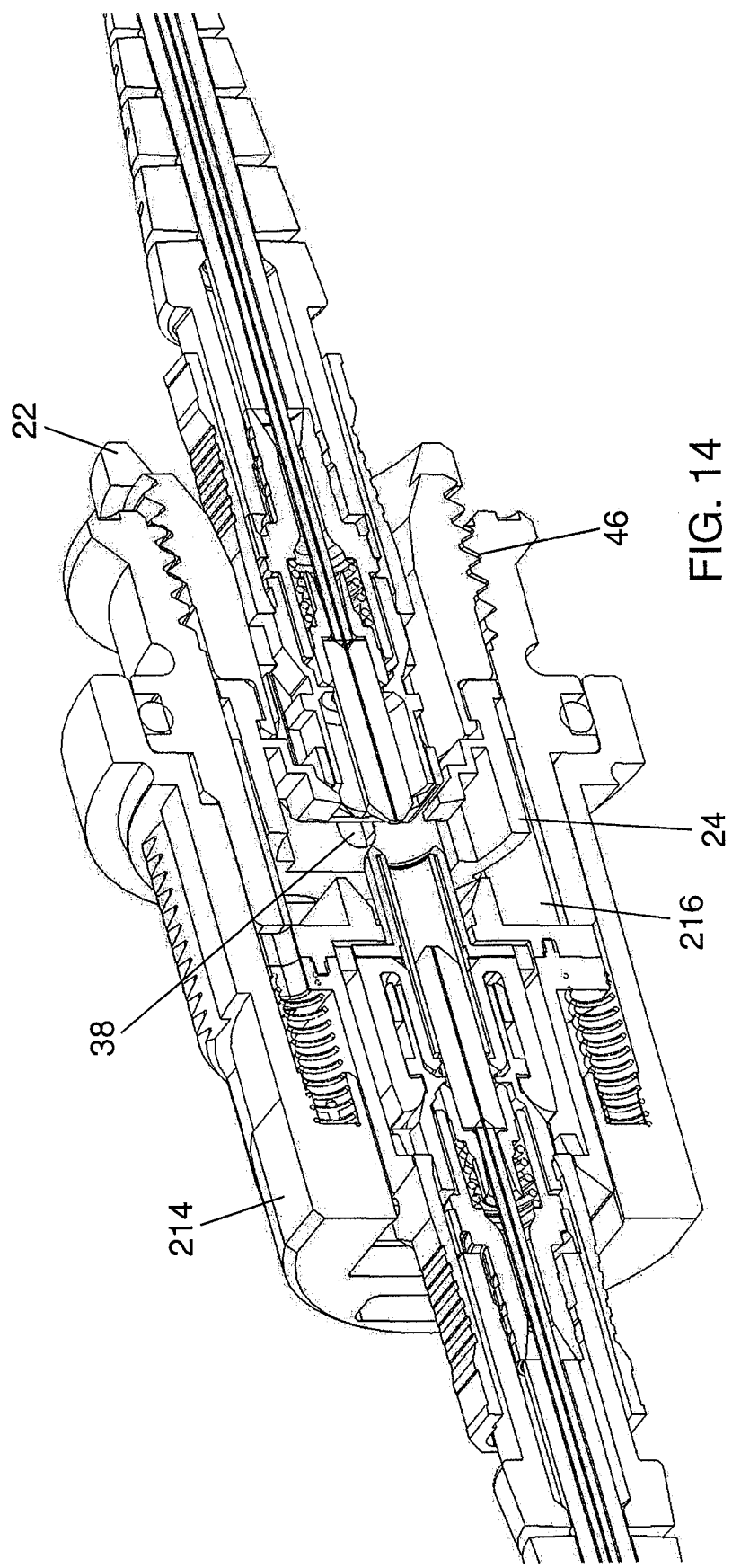
FIG. 14 is a front, top perspective cut-away view cut lengthwise through the standard non-ruggedized SC fiber optic connector partially inserted in the interface converter of FIG. 9 which in turn is inserted in the outer port of the ruggedized fiber optic adapter of FIGS. 2 and 3.
Figure 15:
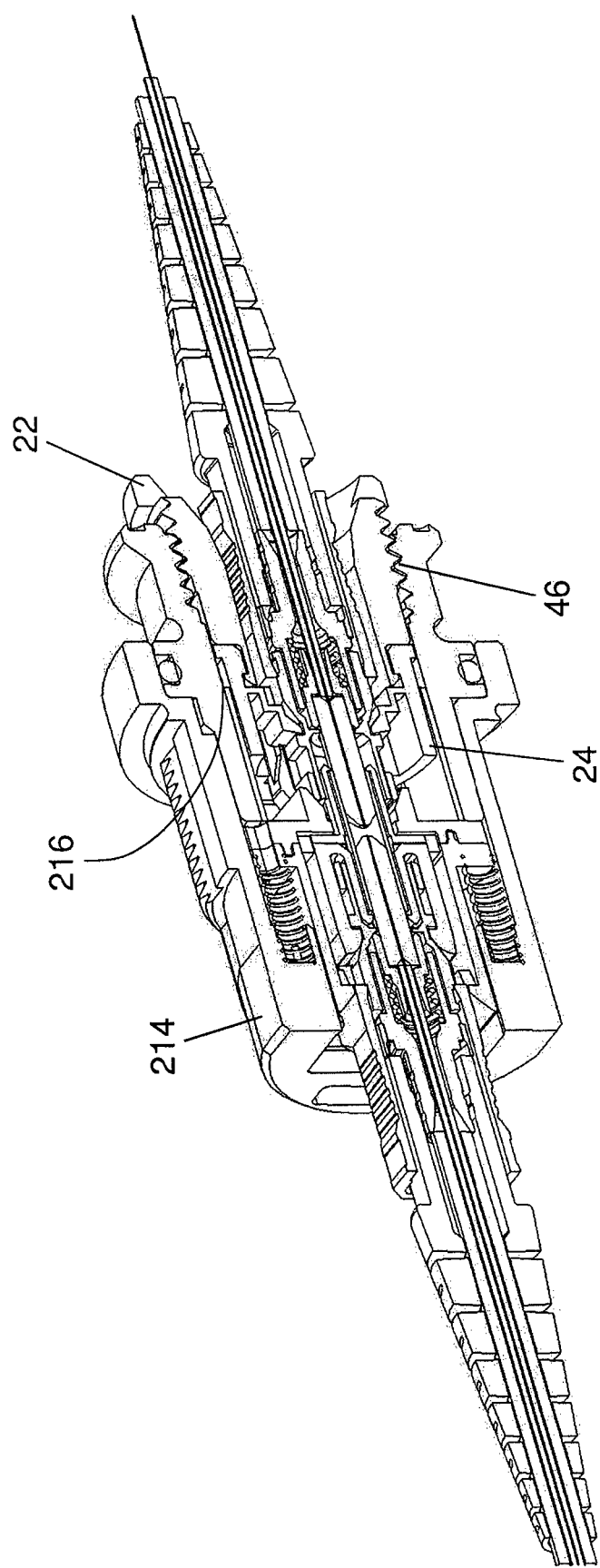
FIG. 15 is a front, top perspective cut-away view cut lengthwise through the standard non-ruggedized SC fiber optic connector inserted in the interface converter of FIG. 9 which in turn is inserted in the outer port of the ruggedized fiber optic adapter of FIGS. 2 and 3.

As shown in FIGS. 14 and 15, the interface converter 20 can be mounted within the outer port 216 of the fiber optic adapter 214 to make the port 216 compatible with the fiber optic connector 422. To mount the interface converter 20 within the outer port 216, the first end 28 of the interface converter 20 is inserted into the port 216 and is manipulated such that the paddles 30 of the connector holder 24 fit within the corresponding receivers/receptacles provided within the outer port 216. Once the connector holder 24 is properly positioned/seated within the port 216, the anchoring piece 22 is threaded into the internal threads 272 of the outer port 216 to secure the interface converter 20 in place within the outer port 216. When mounted within the outer port 216, the second end 40 of the interface converter 20 can be flush with the outer portion of the adapter 214. In other embodiments, the second end 40 may be recessed within the outer port 216 or may project slightly outwardly from the port 216. Notches 49 can be provided at the second end 40. The notches 49 can be sized to interlock with a tool such as a spanner wrench used to turn the anchoring piece 22 within the threads 272.

Once the interface converter 20 is mounted within the outer port 216, the port 216 can accommodate the fiber optic connector 422. For example, the fiber optic connector 422 can be axially inserted into the port 216 through the second end 40 of the interface converter 20. As shown in FIG. 14, when the connector 422 is inserted into the second end 40, the connector 422 passes through the central passages 44, 32 of the interface converter 20. Insertion continues until the latches 34 interlock with the retention shoulders 432 of the connector 422, as shown in FIG. 15. Once the latches 34 interlock with the shoulders 432, the connector 422 is retained at a location with the ferrule 430 positioned at an appropriate depth within the outer end 254 of the split sleeve 250. The connector 422 can be removed from the interface converter 20 by pulling back on the release sleeve 434. To facilitate grasping the release sleeve 434, an extender can be mounted to the back side of the release sleeve 434.

FIGS. 16 through 23 show another interface converter 120 having features that are examples of inventive aspects in accordance with the principles of the present disclosure. The interface converter 120 is also configured to make a non-ruggedized fiber optic connector (e.g., the fiber optic connector 422 of FIGS. 5 through 8) compatible with the outer port 216 of the ruggedized fiber optic adapter 214 of FIGS. 2 and 3. The interface converter 120 mounts over the connector body 424 (e.g., with the release sleeve 434 removed) of the connector 422 and provides a mechanical interface suitable for mating and retaining the fiber optic connector 422 within the outer port 216. Other embodiments of an interface converter may mount with the release sleeve 434 remaining on the connector 422.

Figure 16:
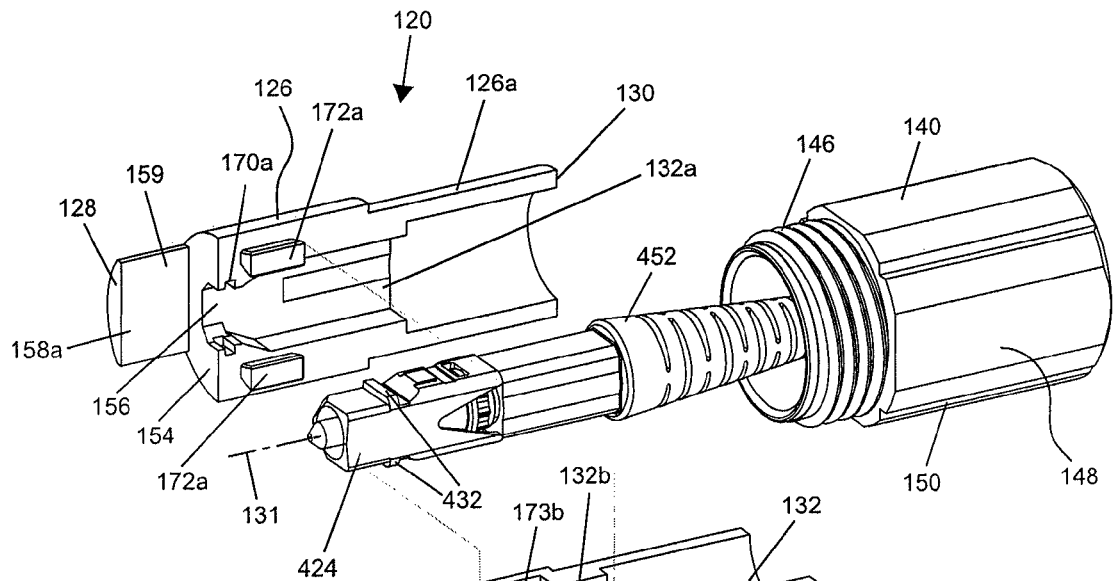
FIG. 16 is a front, side perspective view of another interface converter in an unassembled state having features that are examples of inventive aspects in accordance with the principles of the present disclosure and the standard non-ruggedized SC fiber optic connector of FIGS. 7 and 8.
Figure 17:
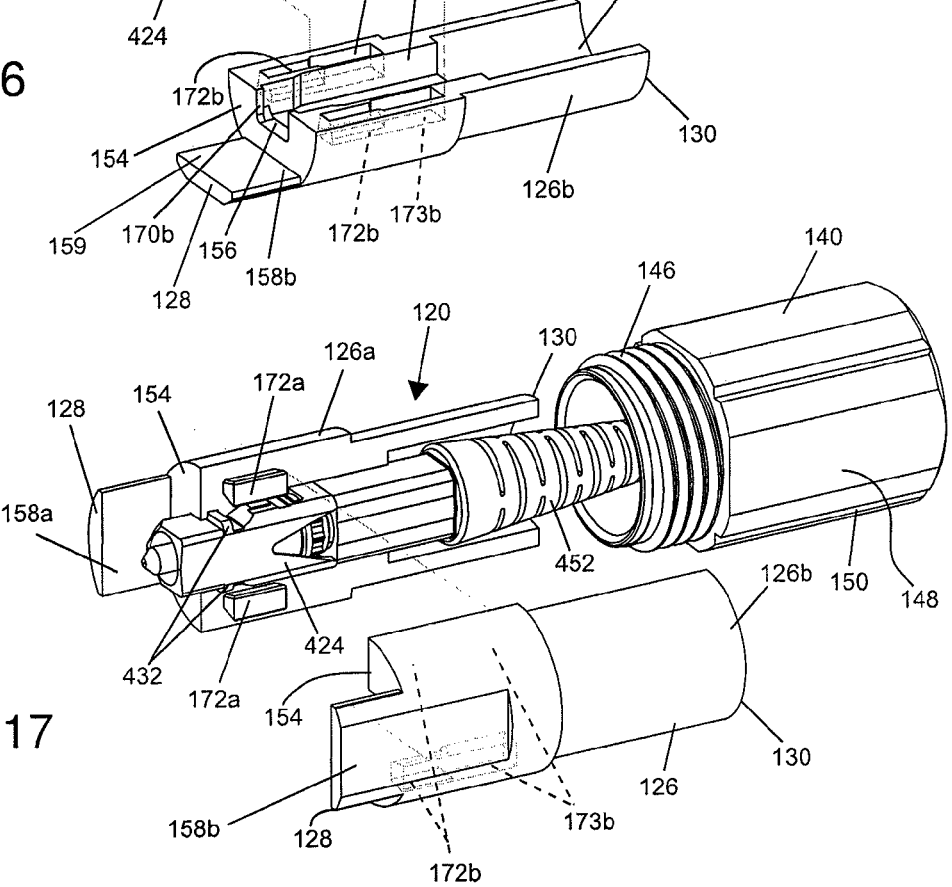
FIG. 17 is a front, side perspective view showing a first assembly step of the interface converter of FIG. 16 and the standard non-ruggedized SC fiber optic connector of FIGS. 7 and 8.
Figure 20:
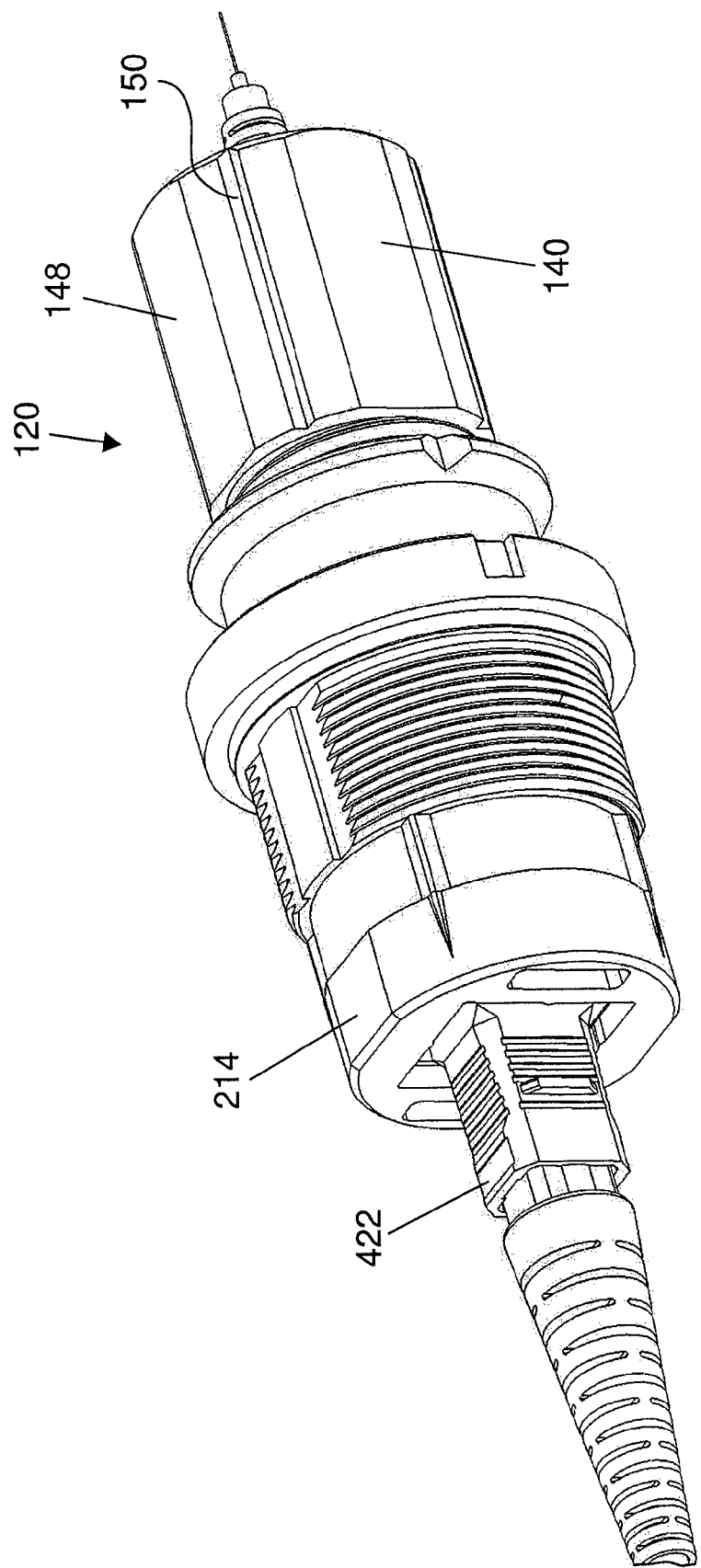
FIG. 20 is a front, side perspective view of an assembly of the interface converter of FIG. 16, the standard non-ruggedized SC fiber optic connector of FIGS. 7 and 8, and the ruggedized fiber optic adapter of FIGS. 2 and 3.

Referring to FIGS. 16 and 17, the interface converter 120 includes a converter housing 126 defining a central passage 132 for receiving the connector body 424 of the fiber optic connector 422. The converter 120 also includes a coupling nut 140 rotatably mounted on the converter housing 126 for use in mechanically retaining the converter 120 within the outer port 216 of the fiber optic adapter 214.

The converter housing 126 of the converter 120 includes a first end 128 and an opposite second end 130. The converter housing 126 defines a central axis 131 that extends through the converter housing 126 from the first end 128 to the second end 130. The central passage 132 extends through the converter housing 126 along the central axis 131. The first end 128 of the converter housing 126 is configured to be mechanically compatible with the outer port 216 of the fiber optic adapter 214. For example, the first end 128 of the converter housing 126 can have a shape that complements, mates with or is otherwise mechanically compatible with the shape of the outer port 216 of the fiber optic adapter 214. The first end 128 is also configured to secure and support the connector body 424 of the fiber optic connector 422. The second end 130 of the converter housing 126 is configured to receive or accommodate the resilient boot 452 of the fiber optic connector 422.

As indicated above, the first end 128 of the converter housing 126 has mechanical characteristics that are compatible with the internal shape of the outer port 216 defined by the fiber optic adapter 214. For example, the first end 128 includes an end wall 154 defining a first opening 156, and also includes a pair of paddles 158a, 158b that project outwardly from the end wall 154 along a direction of connector insertion 155 (see FIG. 19). The paddles 158a, 158b are positioned on opposite sides of the central axis 131 of the converter housing 126 and have inner surfaces 159 that oppose one another. Open side gaps 162 are defined between the paddles 158a, 158b. When the converter housing 126 is mounted over the connector body 424, the ferrule end of the connector body 424 extends through the first opening 156 and is positioned between the paddles 158a, 158b. The paddles 158a, 158b have slightly different shapes and when mated with corresponding structure in the port 216 provide a keying function that ensures that the converter housing 126 is inserted at the proper rotational orientation within the outer port 216.

Figure 21:
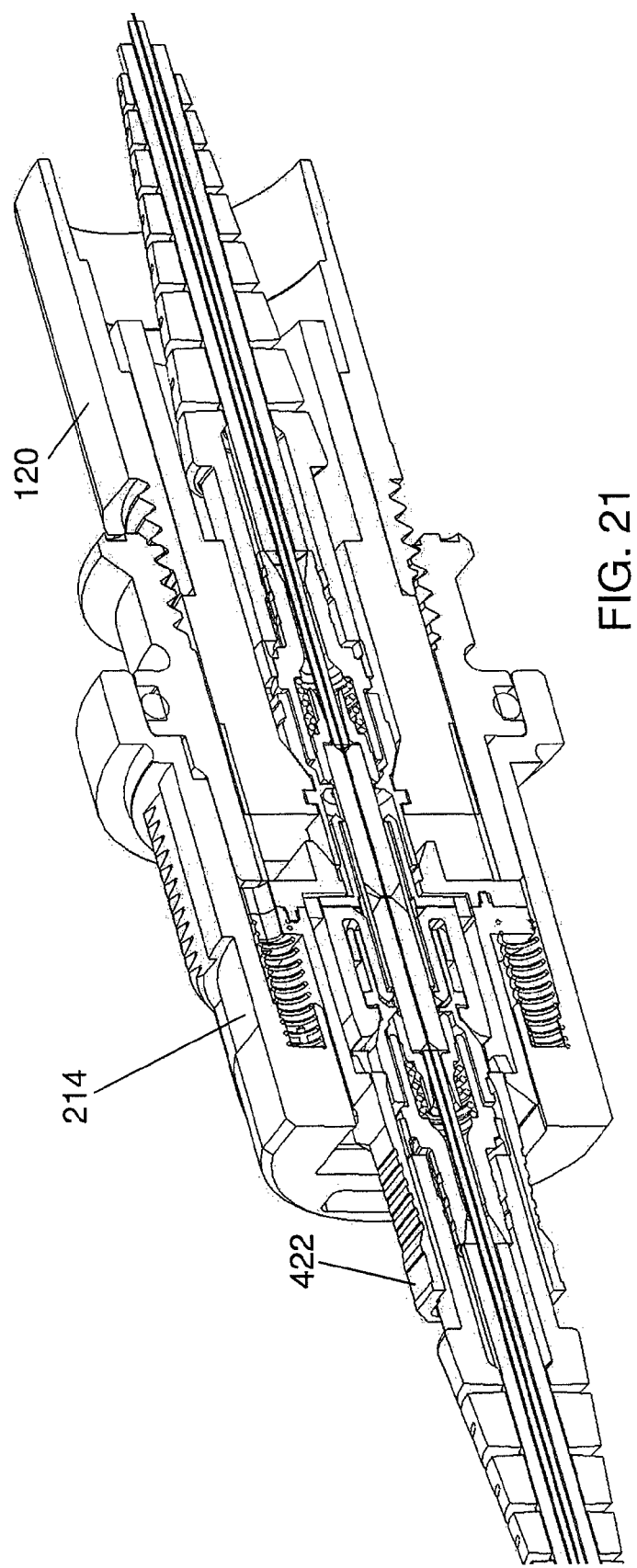
FIG. 21 is a front, side perspective cut-away view cut lengthwise through the assembly of FIG. 20 with the interface converter partially withdrawn from the ruggedized fiber optic adapter.
Figure 22:
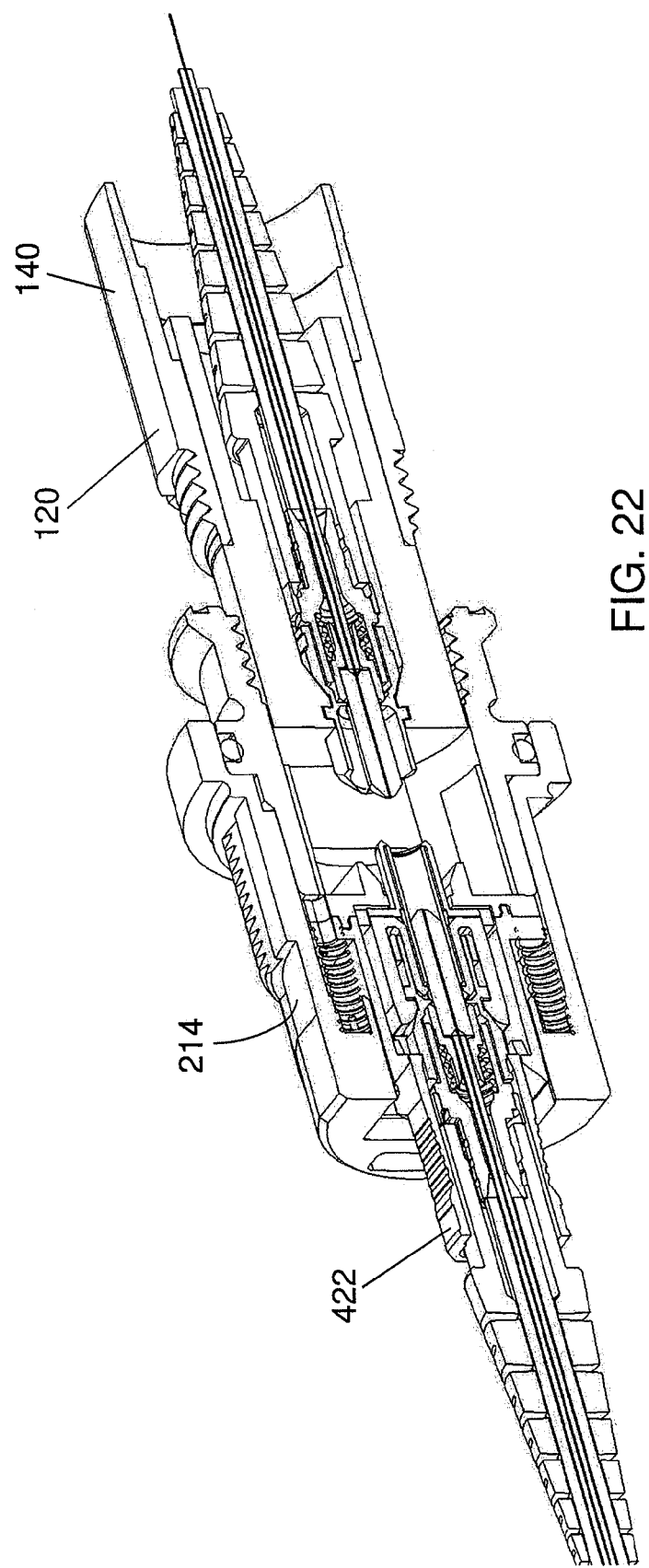
FIG. 22 is a front, side perspective cut-away view cut lengthwise through the assembly of FIG. 20.

The coupling nut 140 of the converter 120 is mounted at the second end 130 of the converter housing 126 and is free to rotate about the exterior of the converter housing 126 (e.g., about the central axis 131). The coupling nut 140 includes an externally threaded portion 146 and a gripping portion 148. The gripping portion 148 defines a plurality of longitudinal depressions or finger grooves 150 for facilitating grasping the gripping portion 148. The threaded portion 146 is sized to be threaded within the internal threads 272 defined within the outer port 216 of the fiber optic adapter 214 to secure the converter 120 within the port 216. As shown in FIGS. 21 and 22, a user can thread the threaded portion 146 of the coupling nut 140 into the internal threads 272 of the fiber optic adapter 214 by inserting the threaded portion 146 into the first port 216 of the fiber optic adapter 214 and manually turning the coupling nut 140 about the converter housing 126 to thread the threaded portion 146 into the first port 216. The gripping portion 148 facilitates gripping and manually turning the coupling nut 140.

The converter housing 126 has a configuration that facilitates mounting the housing 126 over the connector body 424. For example, the converter housing 126 includes first and second half-pieces 126a, 126b that meet at a plane that extends longitudinally along the central axis 131. The half-piece 126a defines a half-passage 132a sized to fit over one half of the connector body 424 and the half-piece 126b defines a half-passage 132b that fits over the other half of the connector body 424. The half-piece 126a includes one of the paddles 158a while the half-piece 126b includes the other paddle 158b, as shown in FIG. 17. In other embodiments, the split line of the housing 126 could be rotated 90 degrees about axis 131.

The half-piece 126a includes a slot arrangement 170a adapted to engage opposite sides of the retention shoulders 432 of the connector body 424 so that the shoulders 432 are captured within the slot arrangement 170a to resist or limit relative axial movement between the connector body 424 and the converter housing 126 in two directions. The half-piece 126b includes a stop surface 170b that abuts against the shoulders 432 but does not capture the shoulders 432. The half-pieces 126a, 126b are mechanically connected by an axial slide arrangement that includes a pair of tongues 172a provided on the half-piece 126a and a pair of grooves 172b provided on the half-piece 126b. The tongue and grooves are aligned parallel to the central axis 131 and are located at the interface between the half-pieces 126a, 126b. The half-piece 126b also includes enlarged access recesses 173b positioned at the ends of the grooves 172b for facilitating inserting the tongues 172a into the grooves 172b, as shown in FIGS. 18 and 19. By inserting the tongues 172a laterally into the recesses 173b, and then sliding the tongues 172a axially into the grooves 172b, the half-pieces 126a, 126b can be coupled together.

To mount the converter 120 on the fiber optic connector 422, the retention nut 140 is first slid over the connector 422 and onto the cable to which the connector 422 is terminated, as shown in FIG. 16. The release sleeve 434 of the connector 422 is then removed from the connector body 424. Once the release sleeve 434 has been removed, the half-piece 126a is inserted laterally over the connector body 424 such that the retention shoulders 432 are received within the slot arrangement 170a (see FIGS. 16 and 17). The half-piece 126b is then inserted laterally toward the half-piece 126a such that the connector body 424 is captured between the pieces 126a, 126b and the tongues 172a are received within the recesses 173b. The half-piece 126b is then slid axially relative to the half-piece 126a in the axial direction indicated by arrow 175 (see FIG. 18), to engage the tongues 172a with the grooves 172b. The half-piece 126b is slid axially in the direction 175 until the stop surface 170b engages the retention shoulders 432. Thereafter, the coupling nut 140 can be slid over the second end 130 of the converter 120, and the connector 422 is ready to be mounted in the outer port 216 of the adapter 214.

Figure 23:
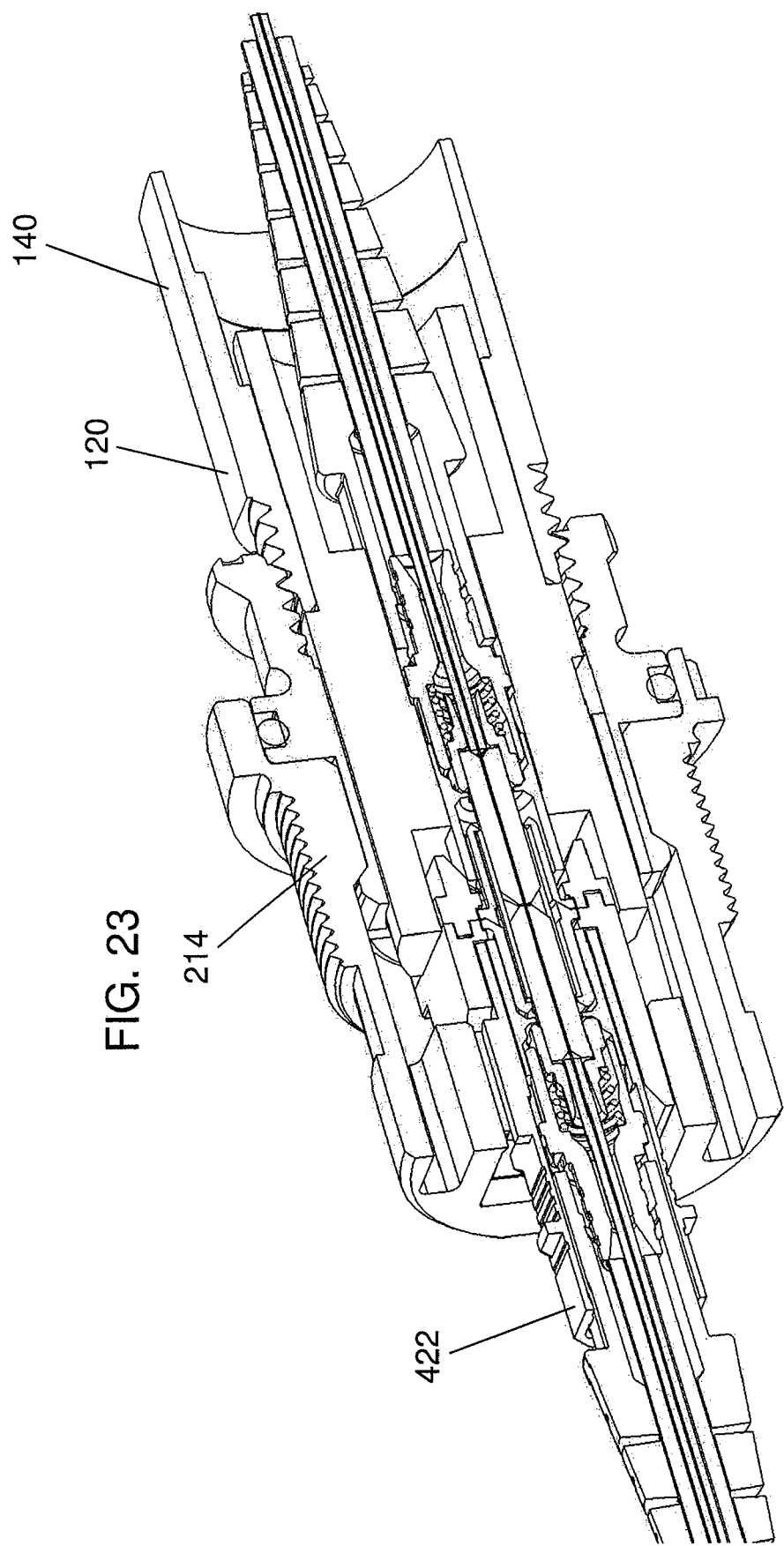
FIG. 23 is a front, top perspective cut-away view cut lengthwise along the middle through the assembly of FIG. 20.

Once the fiber optic connector 422 is mounted within the converter 120, the combined components can be coupled to the fiber optic adapter 214, as shown in FIGS. 20 through 23. For example, the first end 128 of the converter 120 can be inserted within the outer port 216 of the fiber optic adapter 214. As so inserted, the ferrule 430 of the connector 422 is received within the split sleeve 250 positioned within the fiber optic adapter 214, and the paddles 158a, 158b are received within corresponding receptacles within the fiber optic adapter 214 as shown in FIGS. 22 and 23. To insure that the fiber optic connector 422 is fully inserted and secured within the port 216, the threaded portion 146 of the coupling nut 140 is preferably threaded into the internal threads 272 of the fiber optic adapter 214. Threading of the threaded portion 146 into the internal threads 272 can be done manually by grasping the gripping portion 148 and manually turning the coupling nut 140. By unthreading the coupling nut 140 from the fiber optic adapter 214, and axially pulling the converter 120 from the fiber optic adapter 214, the converter 120 and the fiber optic connector 422 can be disconnected from the fiber optic adapter 214.

Figure 24:
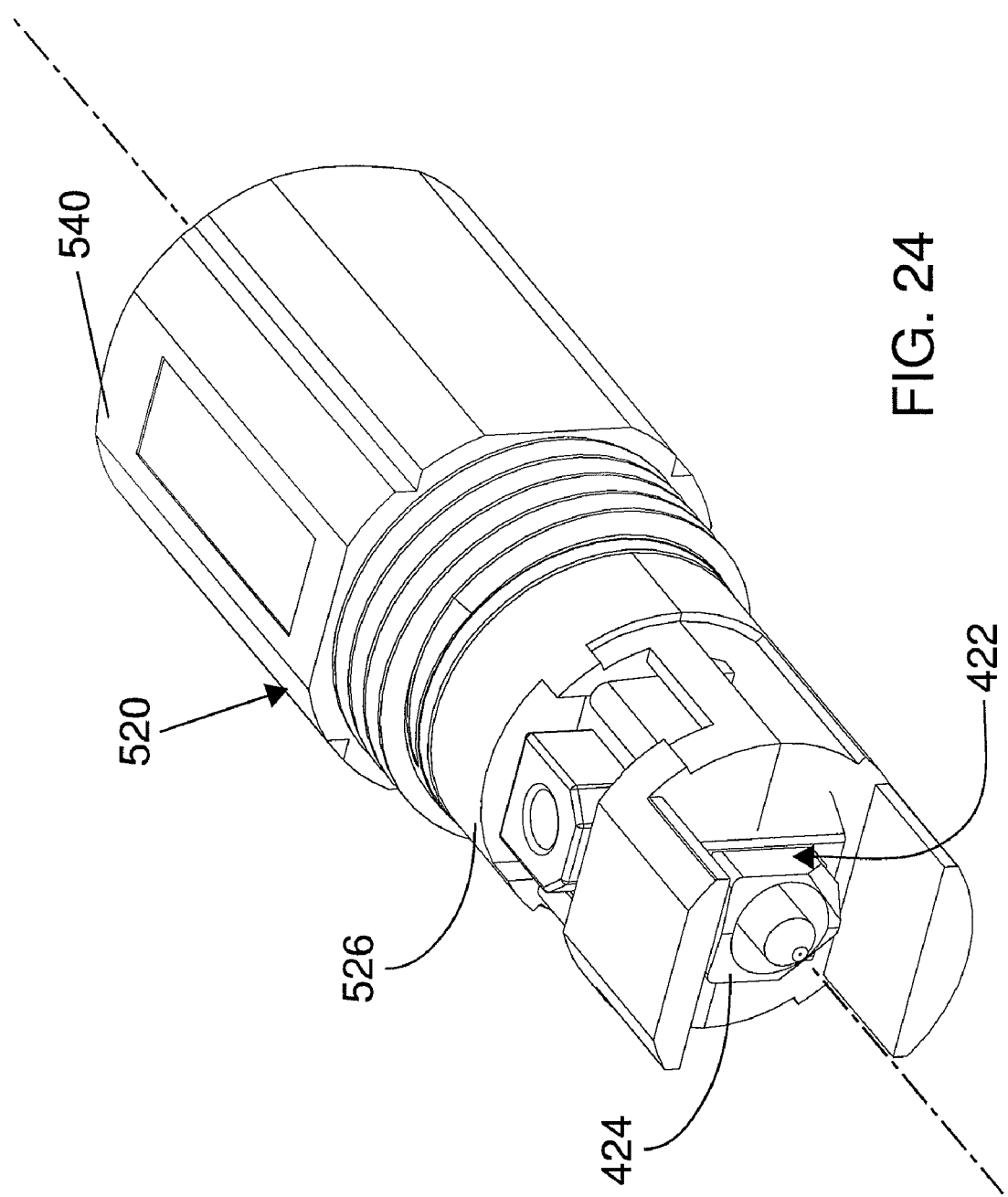
FIG. 24 is a front, side perspective view of another interface converter having features that are examples of inventive aspects in accordance with the principles of the present disclosure.

FIG. 24 shows another interface converter 520 having features that are examples of inventive aspects in accordance with the principles of the present disclosure. The interface converter 520 is also configured to make a non-ruggedized fiber optic connector (e.g., the fiber optic connector 422 of FIGS. 5 through 8) compatible with the outer port 216 of the ruggedized fiber optic adapter 214 of FIGS. 2 and 3. As shown at FIG. 24, the interface converter 520 includes a converter housing 526 that mounts over the connector body 424 (e.g., with the release sleeve 434 removed) of the connector 422 and provides a mechanical interface suitable for mating the fiber optic connector 422 within the outer port 216. The converter 520 also includes a coupling nut 540 rotatably mounted on the converter housing 526 for use in mechanically retaining the converter 520 within the outer port 216 of the fiber optic adapter 214. FIGS. 25 and 26 show the interface converter 520 secured within the outer port 216 of the fiber optic adapter 214 by the coupling nut 540.

Figure 30:
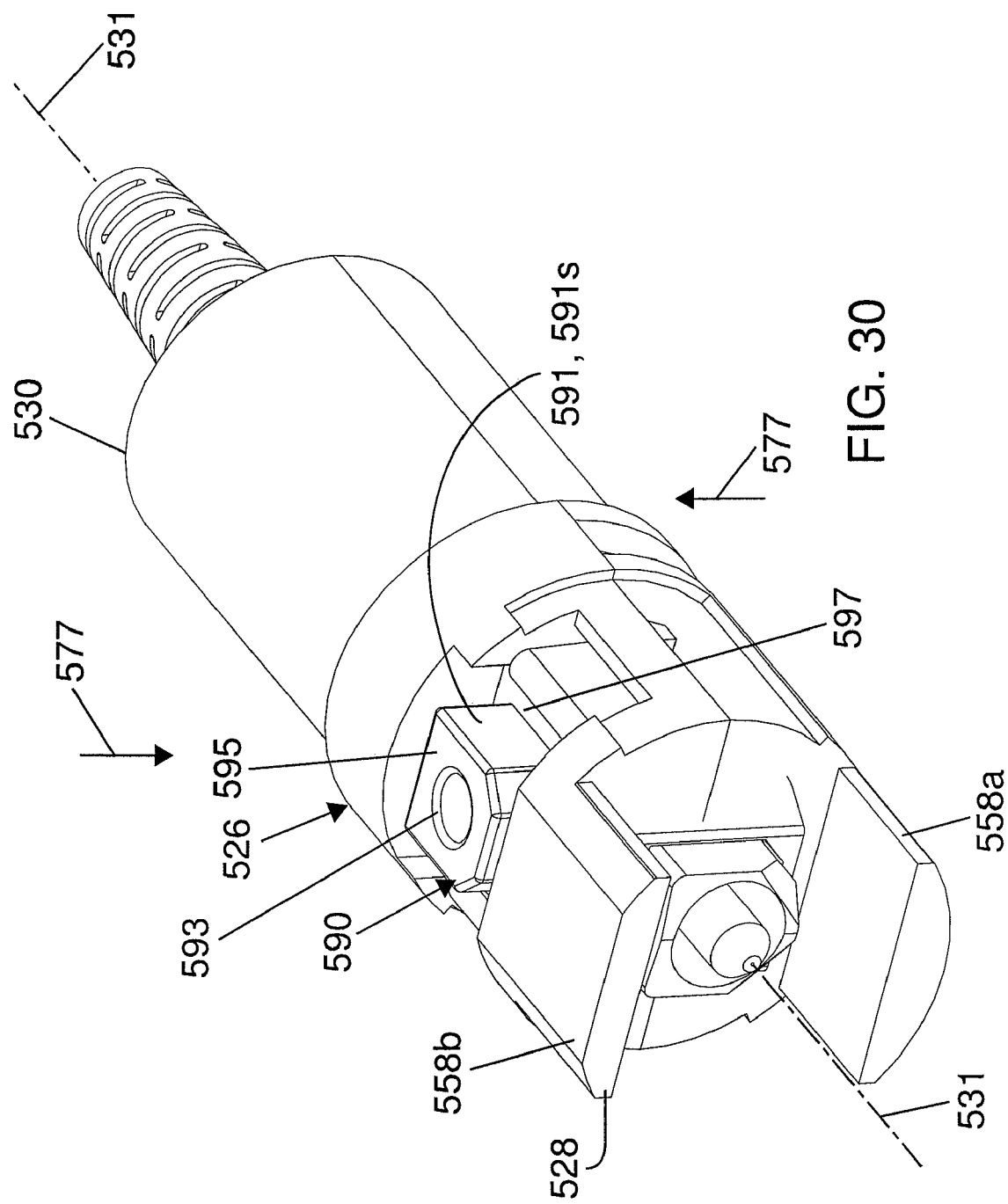
FIG. 30 shows the interface converter housing of FIG. 29 mounted over the SC connector body.

Referring to FIG. 30, the converter housing 526 of the converter 520 includes a first end 528 and an opposite second end 530. A central axis 531 extends through the converter housing 526 from the first end 528 to the second end 530. The first end 528 of the converter housing 526 is configured to be mechanically compatible with the outer port 216 of the fiber optic adapter 214. For example, the first end 528 of the converter housing 526 can have the same configuration as the first end 128 of the converter 120 of FIGS. 16 through 23 (e.g., paddles 558a, 558b). The first end 528 is also configured to secure and support the connector body 424 of the fiber optic connector 422. The second end 530 of the converter housing 526 is configured to receive or accommodate the resilient boot 452 of the fiber optic connector 422.

The coupling nut 540 of the converter 520 is mounted at the second end 530 of the converter housing 526 and is free to rotate about the exterior of the converter housing 526 (e.g., about the central axis 531). The coupling nut 540 has the same configuration as the coupling nut 140 of the converter 120 and is configured to be manually threaded into the threaded portion 146 into the first port 216 of the fiber optic adapter 214 to secure the converter 520 within the first port 216.

Figure 27:
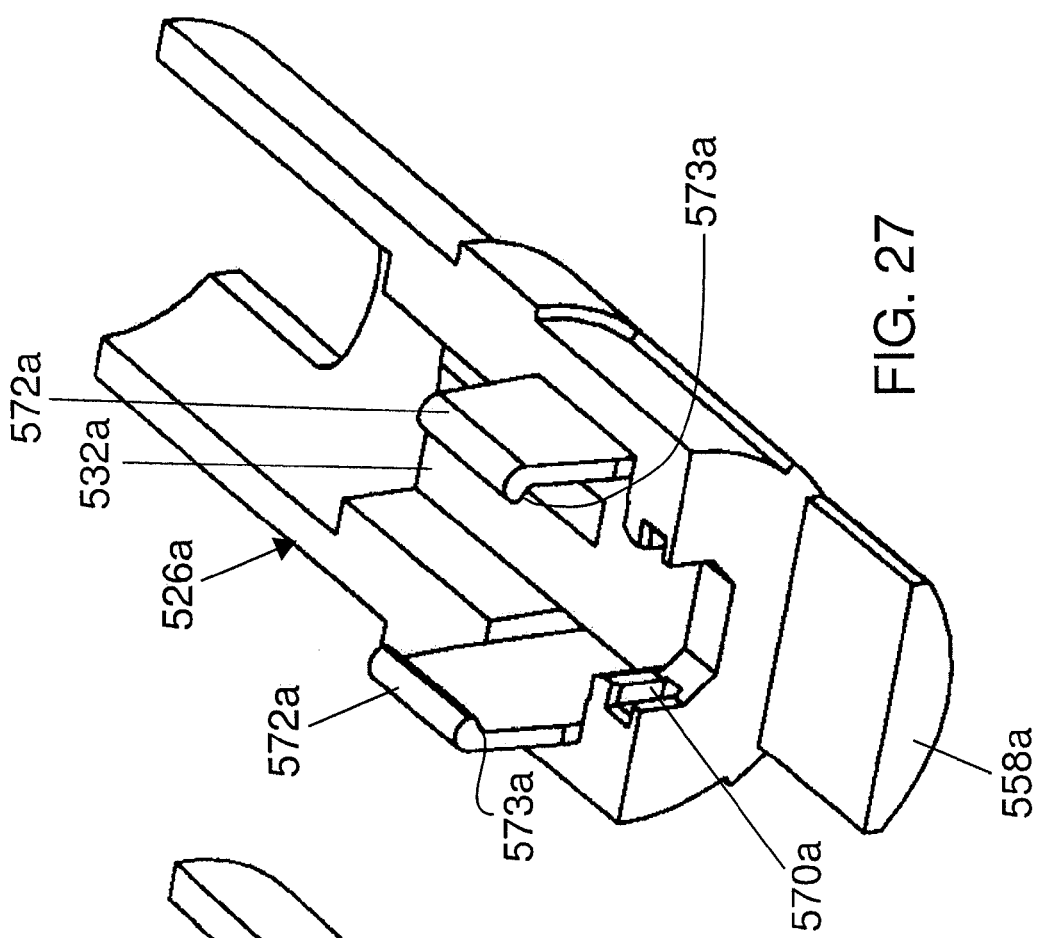
FIG. 27 shows a first half-piece of the interface converter of FIG. 24.
Figure 28:
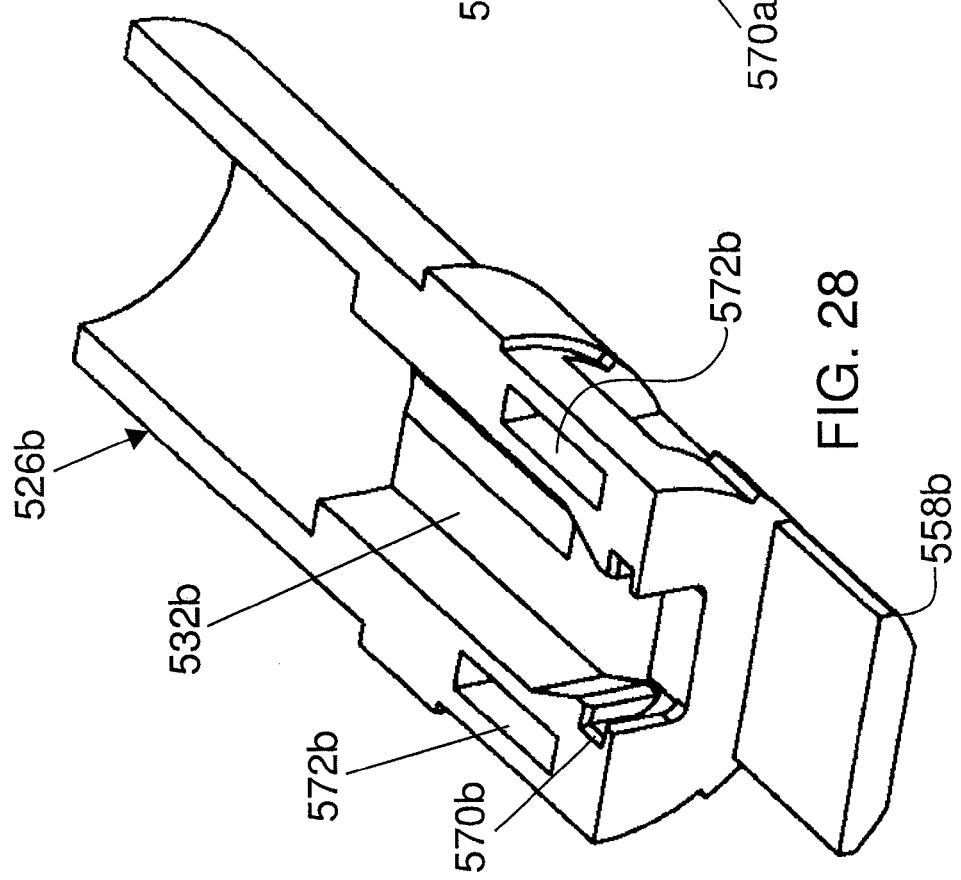
FIG. 28 shows a second half-piece of the interface converter of FIG. 24.

The converter housing 526 has a configuration that facilitates mounting the housing 526 over the connector body 424. For example, the converter housing 126 includes first and second half-pieces 526a, 526b that meet at a plane that extends longitudinally along the central axis 531. The half-piece 526a (see FIG. 27) defines a half-passage 532a sized to fit over one half of the connector body 424 and the half-piece 526b (see FIG. 28) defines a half-passage 532b that fits over the other half of the connector body 424. The half-piece 526a includes one of the paddles 558a while the half-piece 526b includes the other paddle 558b. The half-pieces 526a, 526b include slot arrangements 570a, 570b adapted to engage opposite sides of the retention shoulders 432 of the connector body 424 so that the shoulders 432 are captured within the slot arrangements 570a, 570b to resist or limit relative movement between the connector body 424 and the converter housing 126 in either direction along the axis 531.

Figure 29:
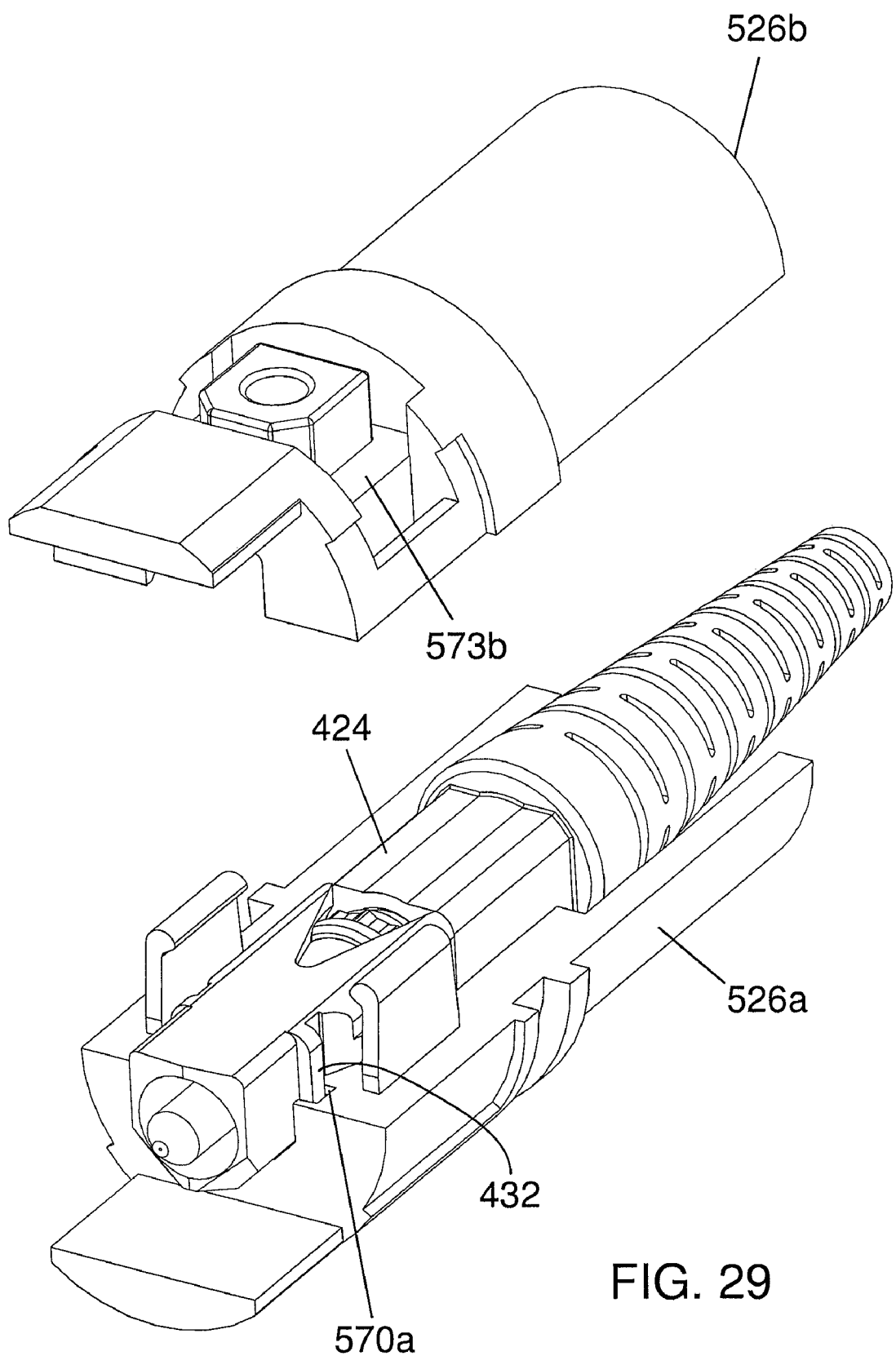
FIG. 29 shows an interface converter housing of the converter of FIG. 24 in the process of being mounted over an SC connector body.

The half-pieces 526a, 526b are mechanically connected by a snap arrangement that includes a pair of latching clips 572a provided on the half-piece 526a and a pair of clip receivers 572b provided on the half-piece 526b. The latching clips 572a include tabs 573a that engage shoulders 573b (see FIG. 29) of the clip receivers 572b when the latching clips 572a are snapped within the clip receivers 572b. The latching clips 572a each have a cantilevered configuration having a base end and a free end. The tabs 573a are provided at the free ends and the base ends are integrally formed with a main body of the half-piece 526a. The latching clips 572a extend in a direction generally perpendicular to the central axis 531 as the latching clips 572a extend from the base ends to the free ends. By inserting the clips 572a into the receivers 572b and then pressing the half-pieces 526a, 526b together (as indicated by arrows 577 shown at FIG. 30) in a direction generally perpendicular to the axis 531, the half-pieces 526a, 526b can be coupled together by a snap-fit connection. By prying/flexing the clips 572a apart from one another, the tabs 573a can be disengaged from the shoulders 573b to allow the half-pieces 626a, 526b to be disassembled.

The half-piece 526b includes an integrated tool 590 for use in removing the release sleeve 434 from the connector body 424 of the connector 422 prior to mounting the converter 520 over the connector body 424. The integrated tool 590 includes a lateral projection 591 defining a clearance opening 593 sized for receiving the ferrule 430 of the connector 422. The projection 591 includes a bearing force surface 595 that surrounds the opening 593. In one embodiment, the projection 591s has an outer shape that generally matches the outer shape of the first end 426 of the connector body 424. In another embodiment, the projection 591b is cylindrical. A recessed region 597 surrounds the projection 591.

Figure 42:
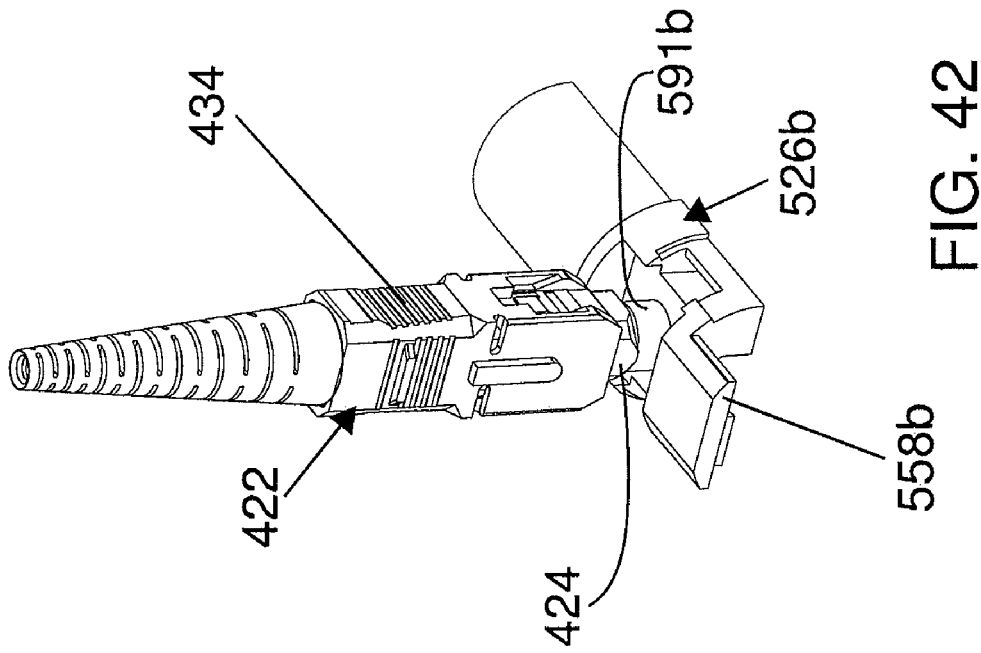
FIG. 42 shows the SC connector of FIG. 31 with the ferrule of the connector inserted within a clearance opening of the release sleeve removal tool of FIG. 41.
Figure 41:
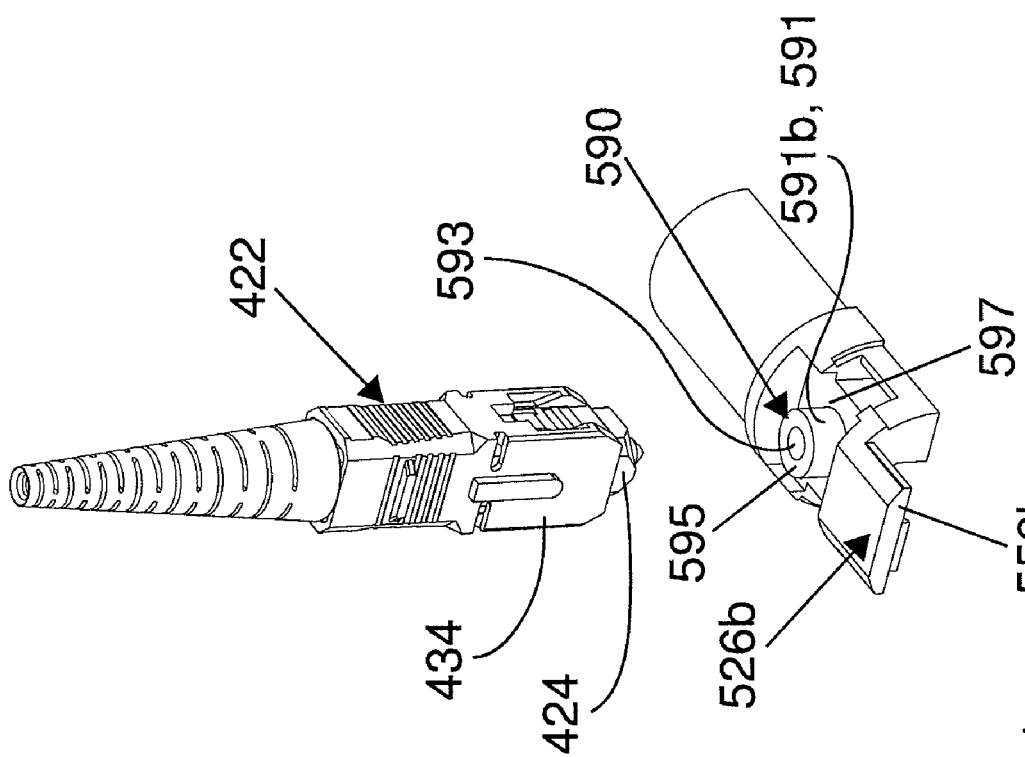
FIG. 41 shows the SC connector of FIG. 31 in alignment with another release sleeve removal tool that is integral with the interface converter housing of the interface converter of FIG. 24.

In use of the tool 590, the half-piece 526b is placed on a firm, flat surface with the bearing force surface 595 of the projection 591 facing upwardly (see FIGS. 31 and 41). A dust cap is then removed from the ferrule 430 of the connector 422 and the ferrule 430 inserted in the clearance opening 593 with the connector 422 extending vertically upwardly from the projection 591 (see FIGS. 32 and 42). If the outer shape of the projection 591s requires (see FIG. 32), the connector 422 is rotated about its central axis 454 (see FIG. 5) until the outer shape of the connector body 424 is in alignment with the outer shape of the projection 591s. If the outer shape of the projection 591b does not require (see FIG. 42), the connector 422 may assume any orientation about its central axis 454 so long as the outer shape of the release sleeve 434 fits within the recessed region 597.

Figure 49:
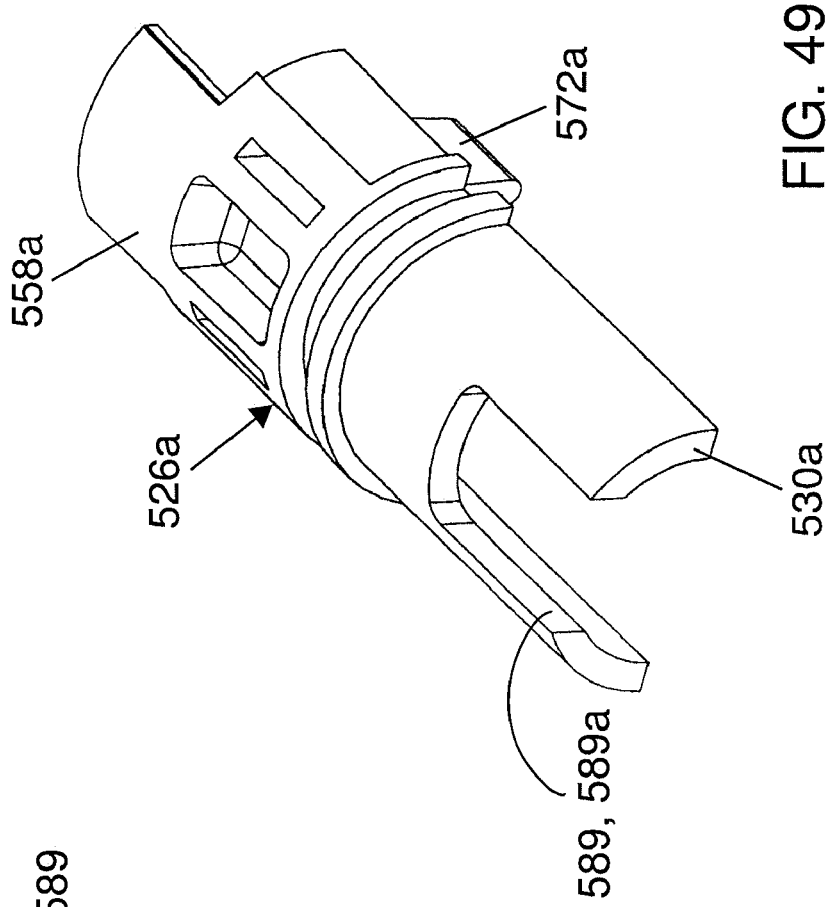
FIG. 49 is a predominantly exterior perspective view of the first half-piece of the interface converter of FIG. 24 integrated with the pushing tool of FIG. 48.
Figure 48:
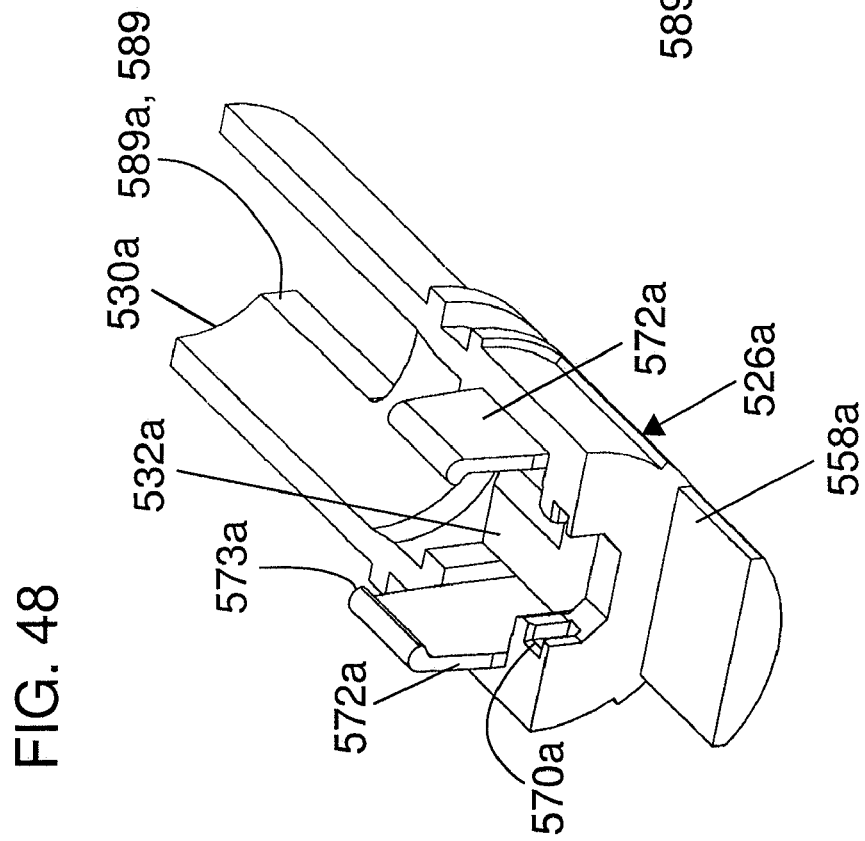
FIG. 48 is a predominantly interior perspective view of the first half-piece of the interface converter of FIG. 24 integrated with another pushing tool.

In certain embodiments, a pushing tool 589 is integrated with the half-piece 526a. Certain forms of the pushing tool 589a have a slot shape, which both allows placement around the fiber optic cable 450 and engages the release sleeve 434 (see FIGS. 48 and 49). Other forms of the pushing tool 589k have a slot shape, which allows placement around the fiber optic cable 450, intersecting with a cylindrical shape, that engages the release sleeve 434 (see FIGS. 43 through 45). The pushing tool 589 may optionally be mounted over the release sleeve 434.

After properly positioning the connector 422, the release sleeve 434 is pushed downwardly (see FIGS. 33 and 44). As the release sleeve 434 is pushed downwardly, the end face of the connector body 424 bears against the bearing force surface 595 of the projection 591 and the release sleeve 434 slides over the projection 591 and into the recessed region 597. By this action, which generates relative linear movement between the release sleeve 434 and the connector body 424, the release sleeve 434 is disengaged from the connector body 424. The connector body 424 can then be drawn out from the release sleeve 434 by pulling up on the connector body 424 or optionally the pushing tool 589 (see FIGS. 34 and 45). The opening 593 is preferably deep enough to protect the end face of the ferrule 430 by preventing the end face from being pressed against another surface during removal of the release sleeve 434 (i.e., the ferrule does not "bottom-out" within the opening when the end face of the connector body 424 is seated on the bearing force surface 595).

Figure 46:
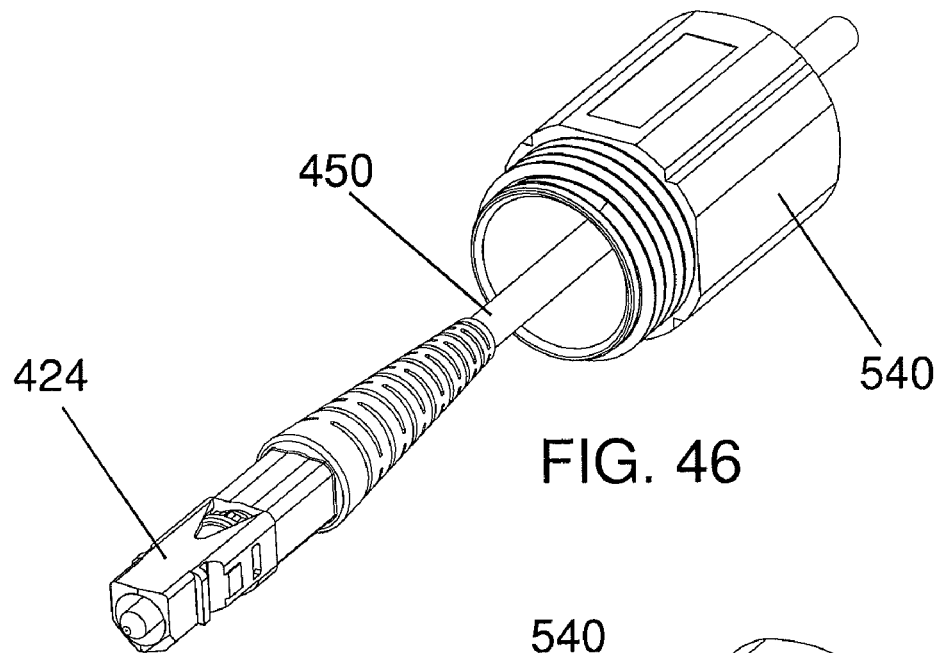
FIG. 46 shows the SC connector of FIG. 31 with the release sleeve removed and a coupling nut positioned over a cable.
Figure 47:
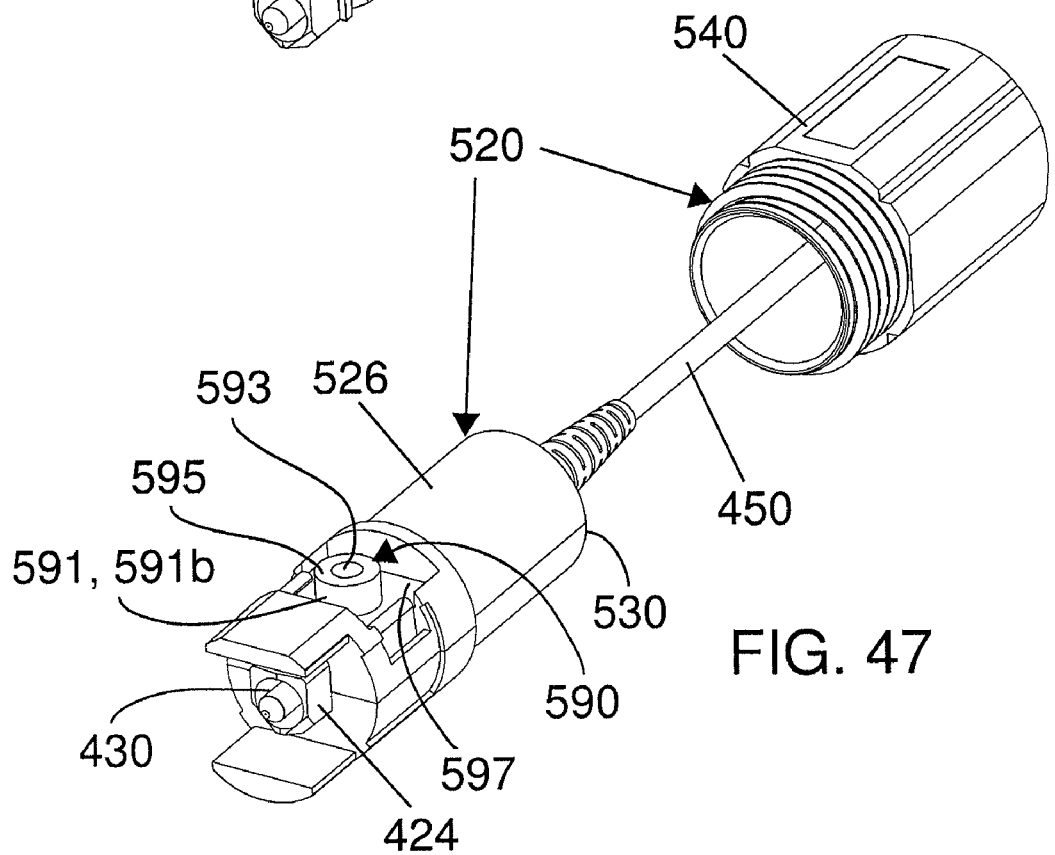
FIG. 47 shows the interface converter housing of FIG. 29 mounted over the SC connector body and the coupling nut positioned over the cable.

To mount the converter 520 on the fiber optic connector 422, the release sleeve 434 of the connector 422 is removed from the connector body 424. The integrated tools 589 and 590 may be optionally used, as described above. Once the release sleeve 434 has been removed, the retention nut 540 is slid over the connector 422 and onto the cable 450 to which the connector 422 is terminated (see FIG. 46). The half-piece 526a is inserted laterally over the connector body 424 such that the retention shoulders 432 of the connector body 424 are received within the slot arrangement 570a (see FIG. 29). When fully inserted, about half of the shoulders 432 are held within the slot arrangement 570a. The half-piece 526b is then inserted laterally toward the half-piece 526a such that the other halves of the retention shoulders 432 of the connector body 424 are received within the slot arrangement 570b and the connector body 424 is captured between the pieces 526a and 526b (see FIGS. 30 and 47). Also, the latching clips 572a are received within the receivers 572b to provide a snap-fit connection between the pieces 526a, 526b as the pieces 526a, 526b are pushed laterally together. Preferably, the snap-fit latching arrangement provides both an audible indication (i.e., a "snap") and a visual indication that the pieces 526a, 526b are latched together. The retention nut 540 is then slid over the second end of the converter housing 526 to complete the assembly process (see FIG. 24). Once the fiber optic connector 422 is mounted within the converter 520, the combined components can be coupled to and uncoupled from the fiber optic adapter 214 is the same manner described with respect to the converter 120.

Figure 35:
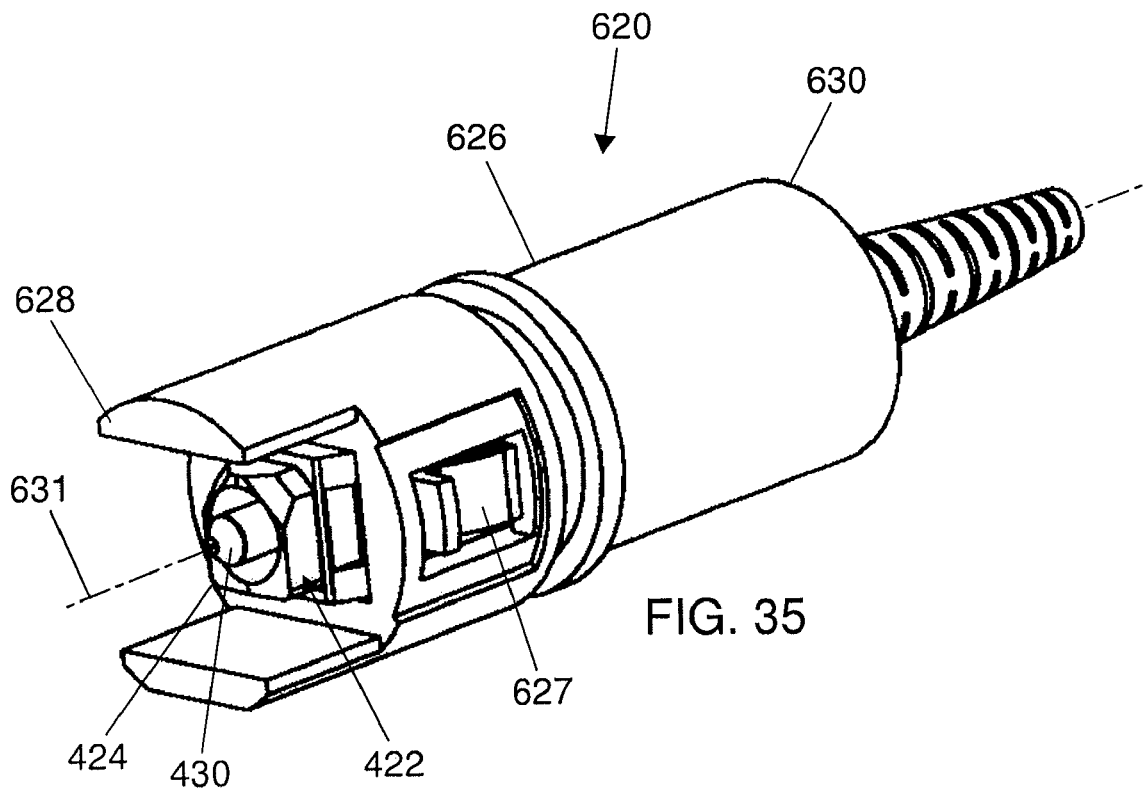
FIG. 35 is a front, side perspective view of a further interface converter having features that are examples of inventive aspects in accordance with the principles of the present disclosure.
Figure 36:
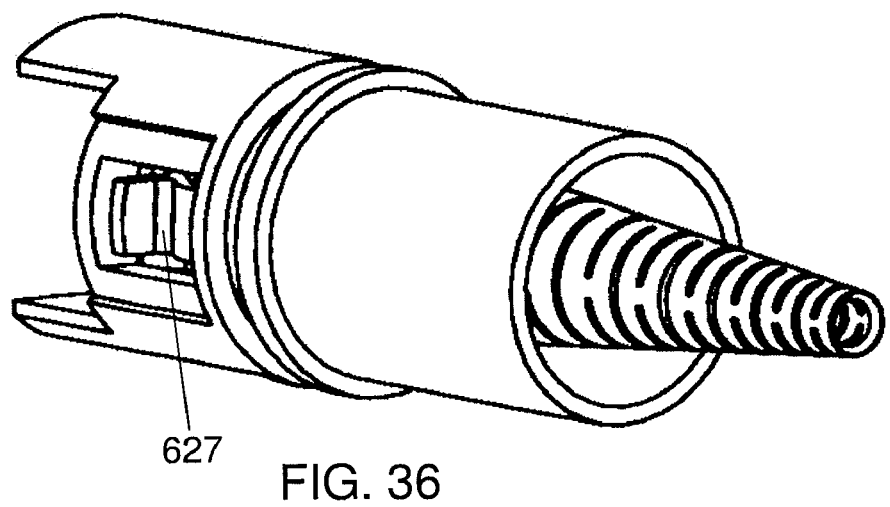
FIG. 36 is a rear, side perspective view of the interface converter of FIG. 35.
Figure 39:
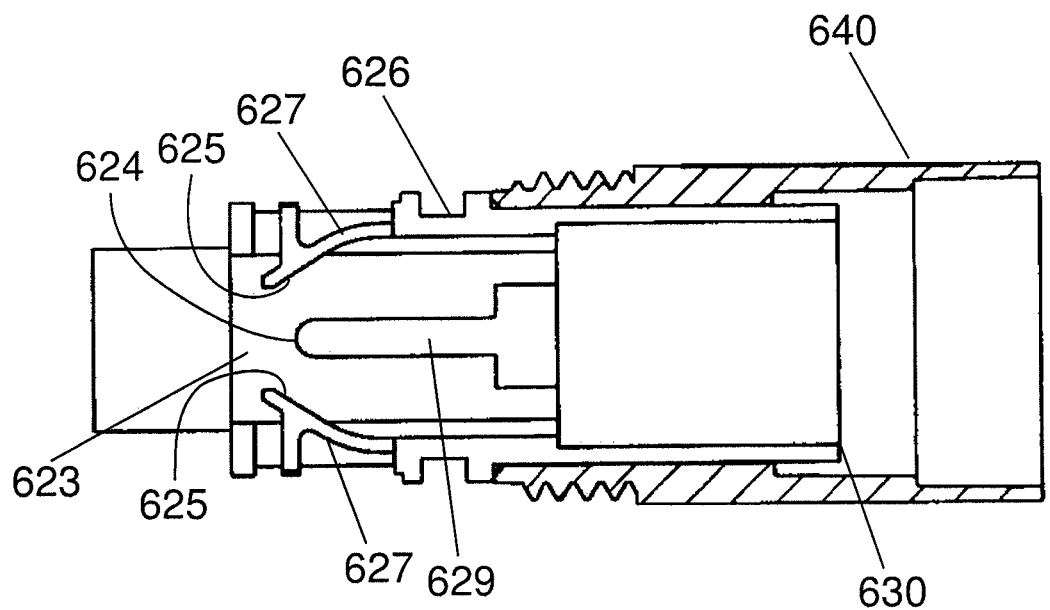
FIG. 39 is a cross-sectional view cut lengthwise through the interface converter of FIG. 35.
Figure 40:
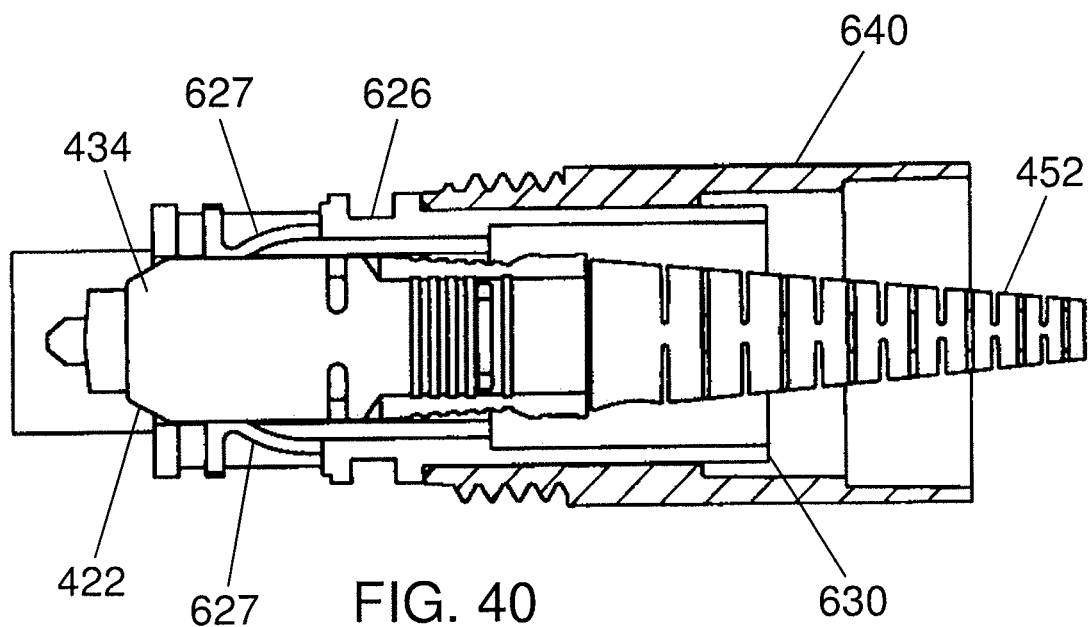
FIG. 40 shows the cross-sectional view of FIG. 39 with an SC connector mounted within the interface converter.

FIGS. 35 through 40 show still another interface converter 620 having features that are examples of inventive aspects in accordance with the principles of the present disclosure. The interface converter 620 is also configured to make a non-ruggedized fiber optic connector (e.g., the fiber optic connector 422 of FIGS. 5 through 8) compatible with the outer port 216 of the ruggedized fiber optic adapter 214 of FIGS. 2 and 3. As shown at FIG. 35, the interface converter 620 includes a converter housing 626 that mounts over the connector 422 (e.g., with the release sleeve 434 in place on the connector body 424) and provides a mechanical interface suitable for mating the fiber optic connector 422 within the outer port 216. The converter 620 also includes a coupling nut 640 (see FIGS. 39 and 40) rotatably mounted on the converter housing 626 for use in mechanically retaining the converter 620 within the outer port 216 of the fiber optic adapter 214.

The converter housing 626 of the converter 620 includes a first end 628 and an opposite second end 630. A central axis 631 extends through the converter housing 626 from the first end 628 to the second end 630. The first end 628 of the converter housing 626 is configured to be mechanically compatible with the outer port 216 of the fiber optic adapter 214. For example, the first end 628 of the converter housing 626 can have the same configuration as the first end 128 of the converter 120 of FIGS. 16 through 23. The first end 628 is also configured to provide access to the ferrule 430 located at the end of the fiber optic connector 422. The second end 630 of the converter housing 626 is configured to receive or accommodate the resilient boot 452 of the fiber optic connector 422.

The coupling nut 640 of the converter 620 is mounted at the second end 630 of the converter housing 626 (see FIGS. 39 and 40) and is free to rotate about the exterior of the converter housing 626 (e.g., about the central axis 631). The coupling nut 640 has the same configuration as the coupling nut 140 of the converter 120 and is configured to be manually threaded into the threaded portion 272 within the first port 216 of the fiber optic adapter 214 to secure the converter 620 within the first port 216.

The converter housing 626 has a one-piece configuration and includes flexible, snap-fit latches 627 to secure the fiber optic connector 422 within the converter housing 626. To mount the converter 620 on the fiber optic connector 422, the fiber optic connector 422 is inserted axially into the converter housing 626 through the second end 630 as indicated by arrows 621 shown at FIGS. 37 and 38. The coupling nut 640 can be mounted at the second end 630 of the converter housing 626 at the time the connector 422 is inserted into the second end 630 of the converter housing 626. The housing 626 includes an internal axial slot 629 (see FIG. 39) sized for receiving the keying rail 435 of the release sleeve 434 and an internal passage 623 sized for receiving the release sleeve 434 when the fiber optic connector 422 is inserted into the converter housing 626. Mating of the keying rail 435 and the slot 629 insures that the connector 422 is oriented in the proper rotational position during insertion of the connector 422 into the converter housing 626. As the fiber optic connector 422 is inserted into the converter housing 626, ramped interior surfaces 625 of the snap-fit latches 627 are initially spread apart by the fiber optic connector 422 and flex to allow passage of the fiber optic connector 422. As the insertion continues, the latches 627 pass over openings 439 defined through the release sleeve 434. The openings 439 allow the latches 627 to at least partially un-flex and project though the openings 439 and engage the retention shoulders 432 provided on the connector body 424. Sloping surfaces 433 (see FIG. 7) provide clearance for the ramped interior surfaces 625 as the snap-fit latches 627 un-flex and engage the retention shoulders 432. The insertion depth of the fiber optic connector 422 into the converter housing 626 is limited by the keying rail 435 of the release sleeve 434 bottoming out at an end 624 of the internal axial slot 629 of the housing 626. The connector 422 is thereby securely retained within the passage 623 between the end 624 of the internal axial slot 629 and the snap-fit latches 627 of the converter housing 626. Preferably, the snap-fit latching arrangement provides both an audible indication (i.e., a "snap") and a visual indication that the connector 422 is latched within the converter housing 626. Once the fiber optic connector 422 is mounted within the converter 520, the combined components can be coupled to and uncoupled from the fiber optic adapter 214 is the same manner described with respect to the converter 120. If desired, the connector 422 can be disconnected from the converter 620 by flexing the snap-fit latches 627 apart and withdrawing the connector 422.

From the forgoing detailed description, it will be evident that modifications and variations can be made in the devices of the disclosure without departing from the spirit or scope of the invention.

What is claimed is:

1. A converter for converting a non-ruggedized SC connector to a ruggedized connector, the non-ruggedized SC connector including a ferrule supported by an SC connector body and a release sleeve that mounts over the SC connector body, the converter comprising:

a converter housing including a first end and an opposite second end, the converter housing defining a central axis that extends through the converter housing from the first end to the second end, the converter housing defining a central passage sized to receive the SC connector body with the ferrule of the non-ruggedized SC connector aligned along the central axis and located adjacent the first end of the converter housing, the first end of the converter housing including opposing first and second paddles positioned at opposite sides of the central axis;

a coupling nut that mounts at the second end of the converter housing, the coupling nut being rotatable relative to the converter housing about the central axis;

the converter housing including a first housing piece and a second housing piece that cooperate to define the central passage of the converter housing such that the SC connector body is retained between the first housing piece and the second housing piece when the SC connector body is mounted within the converter housing, at least one of the first and second housing pieces of the converter housing defining a slot for receiving a retention shoulder of the SC connector body to limit axial movement of the SC connector body relative to the converter housing;

the first housing piece including an integrated tool for use in removing the release sleeve from the SC connector body;

the first and second housing pieces including half-pieces that each generally receive one half of the SC connector body, wherein the first and second housing pieces meet at a plane that extends along the central axis from the first end to the second end of the converter housing; and a release sleeve pushing tool is integrated into the second housing piece, wherein the integrated tool of the first housing piece includes an opening for receiving the ferrule of the non-ruggedized SC connector and a bearing force surface for engaging an end of the SC connector body of the non-ruggedized SC connector.

2. The converter of claim 1, wherein the first housing piece includes the first paddle and the second housing piece includes the second paddle.

3. The converter of claim 1, wherein the first housing piece includes two axial tongues and the second housing piece includes two axial grooves, and wherein the axial tongues slide axially into the axial grooves to secure the first and second housing pieces together.

4. The converter of claim 3, wherein the slot for receiving the retention shoulder of the SC connector body is provided at only one of the first and second housing pieces.

5. The converter of claim 3, wherein the second housing piece includes recessed regions positioned axially adjacent the axial grooves for laterally receiving the axial tongues of the first housing piece prior to axially sliding the axial tongues into the axial grooves.

6. The converter of claim 1, wherein the first housing piece includes two latching clips and the second housing piece includes two clip receivers that receive the latching clips to secure the first and second housing pieces together, and wherein the latching clips slide laterally into the clip receivers when the first and second housing pieces are brought together in a direction generally perpendicular to the central axis of the converter housing.

7. A converter for converting a non-ruggedized SC connector to a ruggedized connector, the non-ruggedized SC connector including a ferrule supported by an SC connector body and a release sleeve that mounts over the SC connector body, the converter comprising:

a converter housing including a first end and an opposite second end, the converter housing defining a central axis that extends through the converter housing from the first end to the second end, the converter housing defining a central passage sized to receive the SC connector body with the ferrule of the non-ruggedized SC connector aligned along the central axis and located adjacent the first end of the converter housing, the first end of the converter housing including opposing first and second paddles positioned at opposite sides of the central axis;

a coupling nut that mounts at the second end of the converter housing, the coupling nut being rotatable relative to the converter housing about the central axis;

the converter housing including an integrated tool for use in removing the release sleeve from the SC connector body;

the converter housing including first and second half-pieces that each generally receive one half of the SC connector body, wherein the first and second half pieces meet at a plane that extends along the central axis from the first end to the second end of the converter housing, wherein the integrated tool is provided at the first half-piece; and a release sleeve pushing tool is integrated into the second half-piece, wherein the integrated tool of the first half-piece including an opening for receiving the ferrule of the non-ruggedized SC connector and a bearing force surface for engaging an end of the SC connector body of the non-ruggedized SC connector.

8. A converter for converting a non-ruggedized SC connector to a ruggedized connector, the non-ruggedized SC connector including a ferrule supported by an SC connector body and a release sleeve that mounts over the SC connector body, the converter comprising:

a converter housing including a first end and an opposite second end, the converter housing defining a central axis that extends through the converter housing from the first end to the second end, the converter housing defining a central passage sized to receive the SC connector body with the ferrule of the non-ruggedized SC connector aligned along the central axis and located adjacent the first end of the converter housing, the first end of the converter housing including opposing first and second paddles positioned at opposite sides of the central axis;

a coupling nut that mounts at the second end of the converter housing, the coupling nut being rotatable relative to the converter housing about the central axis;

the converter housing including an integrated tool for use in removing the release sleeve from the SC connector body;

the converter housing including first and second housing pieces between which the SC connector body is mounted, wherein the integrated tool is provided at the first housing piece; and a release sleeve pushing tool is integrated into the second housing piece, wherein the integrated tool of the first housing piece includes an opening for receiving the ferrule of the non-ruggedized SC connector and a bearing force surface for engaging an end of the SC connector body of the non-ruggedized SC connector.

9. The converter of claim 8, wherein the release sleeve pushing tool includes a slot formed in the second housing piece for engaging the release sleeve.

10. A converter for converting a non-ruggedized SC connector to a ruggedized connector, the non-ruggedized SC connector including a ferrule supported by an SC connector body and a release sleeve that mounts over the SC connector body, the converter comprising:

a converter housing including a first end and an opposite second end, the converter housing defining a central axis that extends through the converter housing from the first end to the second end, the converter housing defining a central passage sized to receive the SC connector body with the ferrule of the non-ruggedized SC connector aligned along the central axis and located adjacent the first end of the converter housing, the first end of the converter housing including opposing first and second paddles positioned at opposite sides of the central axis;

a coupling nut that mounts at the second end of the converter housing, the coupling nut being rotatable relative to the converter housing about the central axis;

the converter housing including an integrated tool for use in removing the release sleeve from the SC connector body; and the integrated tool including a clearance opening for receiving the ferrule of the non-ruggedized SC connector and a bearing force surface for engaging an end of the SC connector body of the non-ruggedized SC connector.

11. The converter of claim 10, wherein the clearance opening is defined within a lateral projection provided on the converter housing, and wherein the lateral projection is sized to fit within an end of the release sleeve.

12. The converter of claim 10, wherein a recessed region surrounds the bearing force surface.

\* \* \* \* \*